(12) United States Patent
Casey et al.

(10) Patent No.: US 9,372,970 B2
(45) Date of Patent: Jun. 21, 2016

(54) GESTURE ENTRY TECHNIQUES

(71) Applicant: APPLE INC., Cupertino, CA (US)

(72) Inventors: Brandon J. Casey, San Jose, CA (US); Jake M. Logan, Palo Alto, CA (US); Erik M. Cressall, San Jose, CA (US); Stephen H. Cotterill, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/651,118

(22) Filed: Oct. 12, 2012

(65) Prior Publication Data

US 2014/0109010 A1    Apr. 17, 2014

(51) Int. Cl.
*G06F 3/048* (2013.01)
*G06F 21/31* (2013.01)
*G06F 3/0488* (2013.01)

(52) U.S. Cl.
CPC ............ *G06F 21/31* (2013.01); *G06F 3/04883* (2013.01)

(58) Field of Classification Search
CPC ................... G06F 3/0482; G06F 2203/0381
See application file for complete search history.

(56) References Cited

U.S. PATENT DOCUMENTS

| | | | |
|---|---|---|---|
| 5,559,961 A | 9/1996 | Blonder | |
| 7,800,592 B2 | 9/2010 | Kerr et al. | |
| 8,539,550 B1 * | 9/2013 | Terres et al. | 726/2 |
| 8,584,031 B2 | 11/2013 | Moore et al. | |
| 8,627,235 B2 | 1/2014 | Chang et al. | |
| 8,756,511 B2 | 6/2014 | Heo et al. | |
| 8,806,612 B2 | 8/2014 | Kao | |
| 2003/0103653 A1 | 6/2003 | Avni et al. | |
| 2004/0106445 A1 * | 6/2004 | Perrie et al. | 463/16 |
| 2005/0253817 A1 | 11/2005 | Rytivaara et al. | |
| 2006/0155746 A1 * | 7/2006 | Abrams et al. | 707/102 |
| 2007/0234889 A1 * | 10/2007 | Rotolo de Moraes | 84/730 |
| 2008/0163130 A1 | 7/2008 | Westerman | |
| 2008/0178126 A1 | 7/2008 | Beeck et al. | |
| 2009/0284482 A1 * | 11/2009 | Chin | 345/173 |
| 2009/0289916 A1 | 11/2009 | Dai | |
| 2009/0303231 A1 | 12/2009 | Robinet et al. | |
| 2009/0313693 A1 | 12/2009 | Rogers | |

(Continued)

OTHER PUBLICATIONS

Droid-X by Motorola User Guide, "Security Through Pretty Pictures: The Unlock Pattern;".

(Continued)

*Primary Examiner* — William Bashore
*Assistant Examiner* — Rayeez Chowdhury
(74) *Attorney, Agent, or Firm* — Morgan, Lewis & Bockius LLP

(57) ABSTRACT

Techniques are provided for entering and saving a gesture on a touch-sensitive display device. In one embodiment, the device displays an array of visible graphical elements and may detect a gesture based on a user's touch of the visible graphical elements as well as on hidden areas not displayed to the user. For example, the device may detect a user's touch over hidden dots between the visible graphical elements or through hidden lines connecting the visible graphical elements. Some embodiments may include algorithms for improving accuracy in detecting the intended gesture. For example, the device may estimate possible or probable paths based on a current user touch position. In some embodiments, the visible graphical elements may be illuminated when a touch of the visible graphical elements is detected, or a disc representing a user's touch may be displayed as the user enters a gesture.

33 Claims, 21 Drawing Sheets

(56) References Cited

U.S. PATENT DOCUMENTS

| | | | |
|---|---|---|---|
| 2010/0132043 A1 | 5/2010 | Bjorn et al. | |
| 2010/0134431 A1 | 6/2010 | Tsai et al. | |
| 2010/0235726 A1 | 9/2010 | Ording et al. | |
| 2010/0257448 A1* | 10/2010 | Squires | 715/717 |
| 2010/0262905 A1 | 10/2010 | Li | |
| 2011/0041102 A1* | 2/2011 | Kim | 715/863 |
| 2011/0050583 A1* | 3/2011 | Tho | 345/169 |
| 2011/0066984 A1* | 3/2011 | Li | 715/863 |
| 2011/0070864 A1 | 3/2011 | Karam et al. | |
| 2011/0154268 A1 | 6/2011 | Trent, Jr. et al. | |
| 2011/0156867 A1 | 6/2011 | Carrizo et al. | |
| 2011/0187497 A1 | 8/2011 | Chin | |
| 2011/0283241 A1 | 11/2011 | Miller et al. | |
| 2011/0300831 A1* | 12/2011 | Chin | 455/411 |
| 2012/0060128 A1 | 3/2012 | Miller et al. | |
| 2012/0066650 A1 | 3/2012 | Tirpak et al. | |
| 2012/0133484 A1 | 5/2012 | Griffin | |
| 2012/0146927 A1 | 6/2012 | Chang et al. | |
| 2012/0204258 A1 | 8/2012 | Lee | |
| 2012/0252410 A1* | 10/2012 | Williams | 455/411 |
| 2012/0304098 A1 | 11/2012 | Kuulusa | |
| 2012/0304284 A1* | 11/2012 | Johnson et al. | 726/19 |
| 2013/0267250 A1* | 10/2013 | Lin et al. | 455/456.3 |
| 2014/0085241 A1* | 3/2014 | Christiansson et al. | 345/173 |
| 2014/0109010 A1 | 4/2014 | Casey et al. | |

OTHER PUBLICATIONS

Droid X by Motorola User Guide, "Security Through Pretty Pictures: The Unlock Pattern," Apr. 7, 2011, 72 pages.

Notice of Allowance, dated Aug. 5, 2015, received in U.S. Appl. No. 13/651,100, 5 pages.

Office Action, dated Dec. 20, 2013, received in U.S. Appl. No. 13/651,100, 41 pages.

Final Office Action, dated May 15, 2014, received in U.S. Appl. No. 13/651,100, 51 pages.

Office Action, dated Dec. 1, 2014, received in U.S. Appl. No. 13/651,100, 49 pages.

Notice of Allowance, dated Apr. 8, 2015, received in U.S. Appl. No. 13/651,100, 10 pages.

* cited by examiner

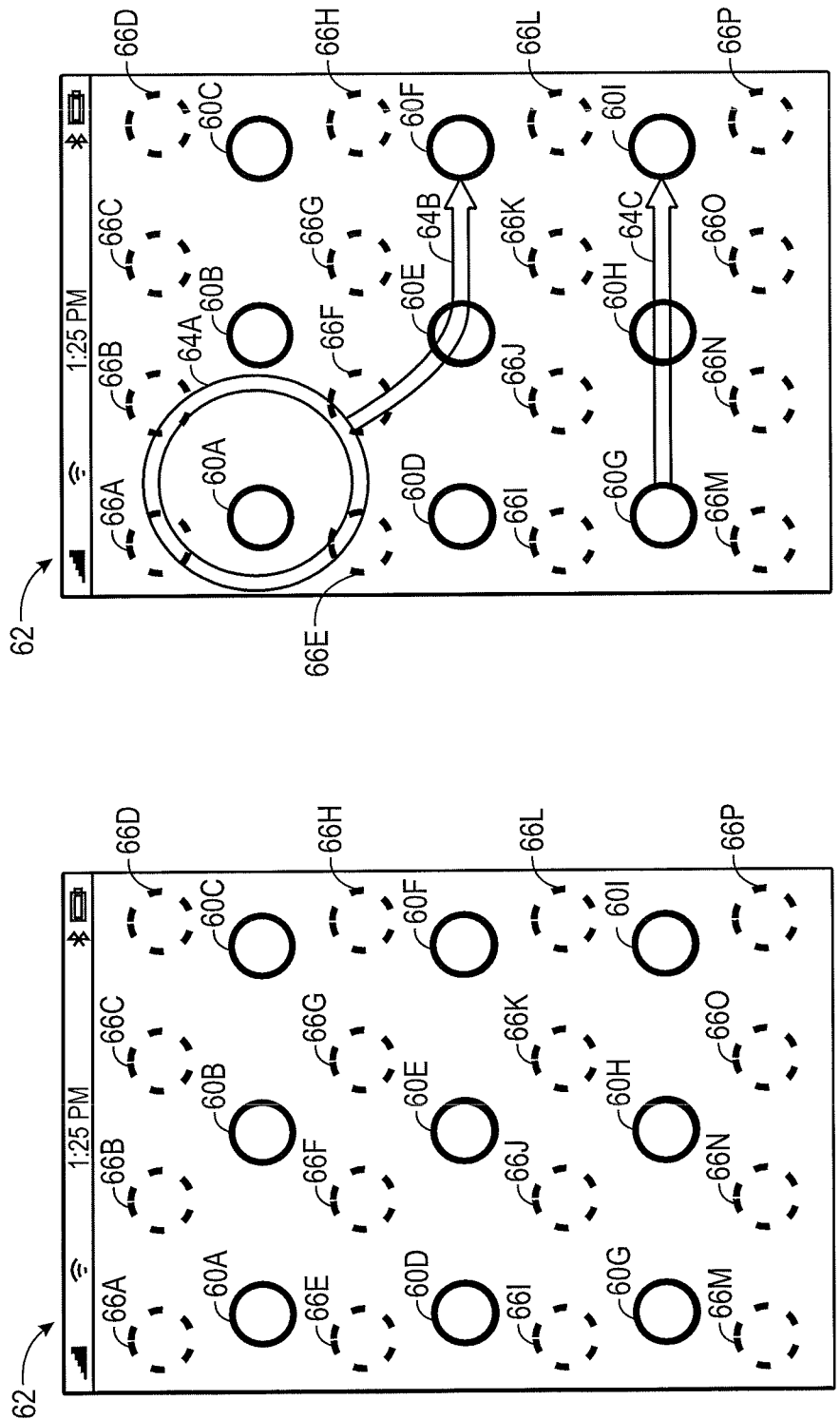

GESTURE ENTRY TECHNIQUES

BACKGROUND

The present disclosure relates generally to electronic devices, and more specifically to techniques for entering gesture authentications into electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to controlling access to information or applications stored on an electronic device, such as a handheld or portable device. This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, and in particular portable electronic devices (e.g., portable media players, cellular telephones and notebook and tablet computers) are increasingly used for storing various types of information. Such information may include confidential information such as phone numbers, personal and professional contacts, electronic communications, information relating to finances or financial accounts, business related projects and documents, personal photos and videos, personal and business contacts, and so forth. Storing such information on a portable electronic device allows a user to access the information wherever the user may take the device. However, storing such information on a portable electronic device may also increase the risk that confidential information may be lost, stolen, or accessed by an unauthorized person.

Some electronic devices are configured with security measures to decrease accessibility of confidential information to unauthorized parties. However, conventional security measures such as the use of alphanumeric security codes (e.g., passwords, personal identification numbers [PINs], etc.) may not provide adequate security. In particular, screens or fields for entering a password or PIN may be visible to a bystander who may be able to view the entered security code. Furthermore, users may select a password or PIN which may be guessed relatively easily and may not provide a high degree of security for the stored confidential information.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present embodiments relate to the use of security measures based on non-alphanumeric inputs that are user configurable (as opposed to purely biometric inputs) to control access to restricted information or functions. For example, access to confidential information may be based on a gesture input via a touch-sensitive input device, such as a touch-sensitive display or touchpad. A gesture may be used to invoke one or more authentication screens such as, a gesture entry screen, for accessing confidential information or functions that may be otherwise unavailable.

In certain embodiments of the present disclosure, an authentication gesture entry screen is displayed to allow a user to enter a desired gesture via an array of visible and/or invisible touch sensing areas displayed on a touch-sensitive display. To enter or input the authentication gesture, the user travels a path along the touch sensing areas using one or more fingers until achieving a desired gesture. If the entered gesture is estimated as a strong gesture, then the entered gesture is saved for the purpose of user authentication and/or authorization.

BRIEF DESCRIPTION OF THE DRAWINGS

Various aspects of this disclosure may be better understood upon reading the following detailed description and upon reference to the drawings in which:

FIG. 8 depicts a 4×4 array of hidden dots on the gesture entry screen of FIG. 4 in accordance with present embodiments;

FIG. 9 depicts an example of an entered gesture on the gesture entry screen of FIG. 8 in accordance with present embodiments;

DETAILED DESCRIPTION OF SPECIFIC EMBODIMENTS

Figure 1:
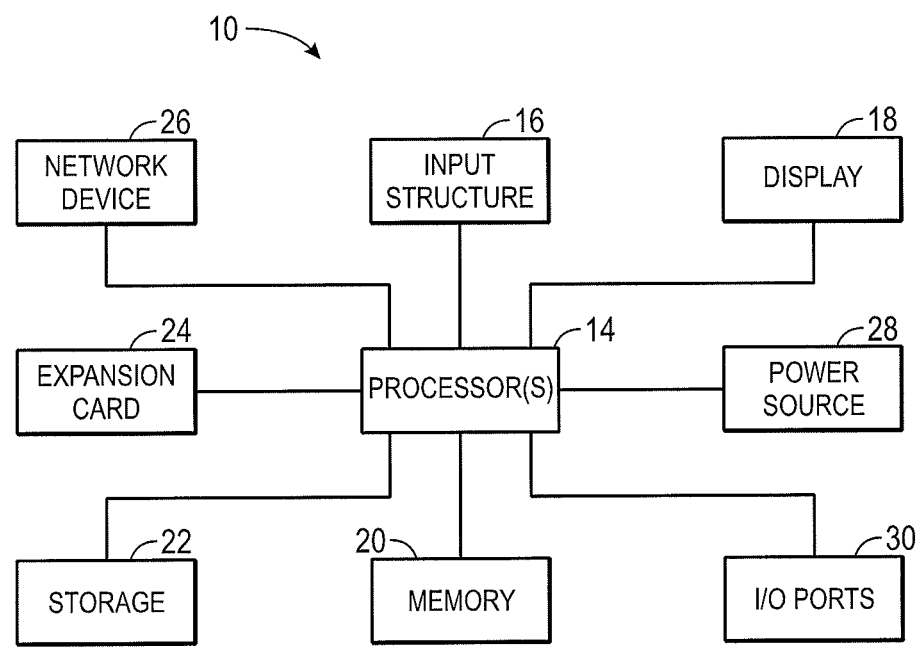
FIG. 1 is a block diagram of example components of an electronic device, in accordance with present embodiments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques allow for securely accessing confidential and/or hidden information or functions stored on an electronic device. Examples of such information and functions may include bank account or credit card information (as well as other types of financial information), personal contacts, personal photos, applications that allow or invoke confidential information, and networks or similar communication options that may be accessible via an electronic device. The information or functions may be accessed using non-alphanumeric (e.g., characters or elements not found on a keyboard), and non-biometric inputs that are user configurable, such as gestures or sequence codes. In certain embodiments, an initial screen may not display any reference to the existence of the confidential data or functions or any visible selection related to accessing such data or function. The presently disclosed techniques allow a user to enter and save an authentication gesture to restrict access to such confidential data or functions. Once the entered authentication gesture is saved, the confidential data and/or functions can be accessed only if a subsequent entry of an authentication gesture is substantially the same as the saved authentication gesture.

In one embodiment, the gesture entry screen is displayed to allow a user to enter a desired gesture via an array of visible graphical elements including illuminated dots, invisible touch-sensing areas including hidden dots and/or hidden lines, or a combination of visible graphical elements and touch-sensing areas on a touch-sensitive display. To enter or input the gesture, the user travels a path at least along, between, near, or around the visible graphical elements using one or more fingers until achieving a desired gesture, or until a strength estimation indicator displayed on the gesture entry screen indicates to the user that the entered gesture is estimated as a strong gesture.

The user then saves the entered gesture to restrict access to confidential data and/or functions. Once the entered gesture is saved, the confidential data and/or functions can be accessed only if a subsequent entry of a gesture is substantially the same as the saved authentication gesture.

Figure 2:
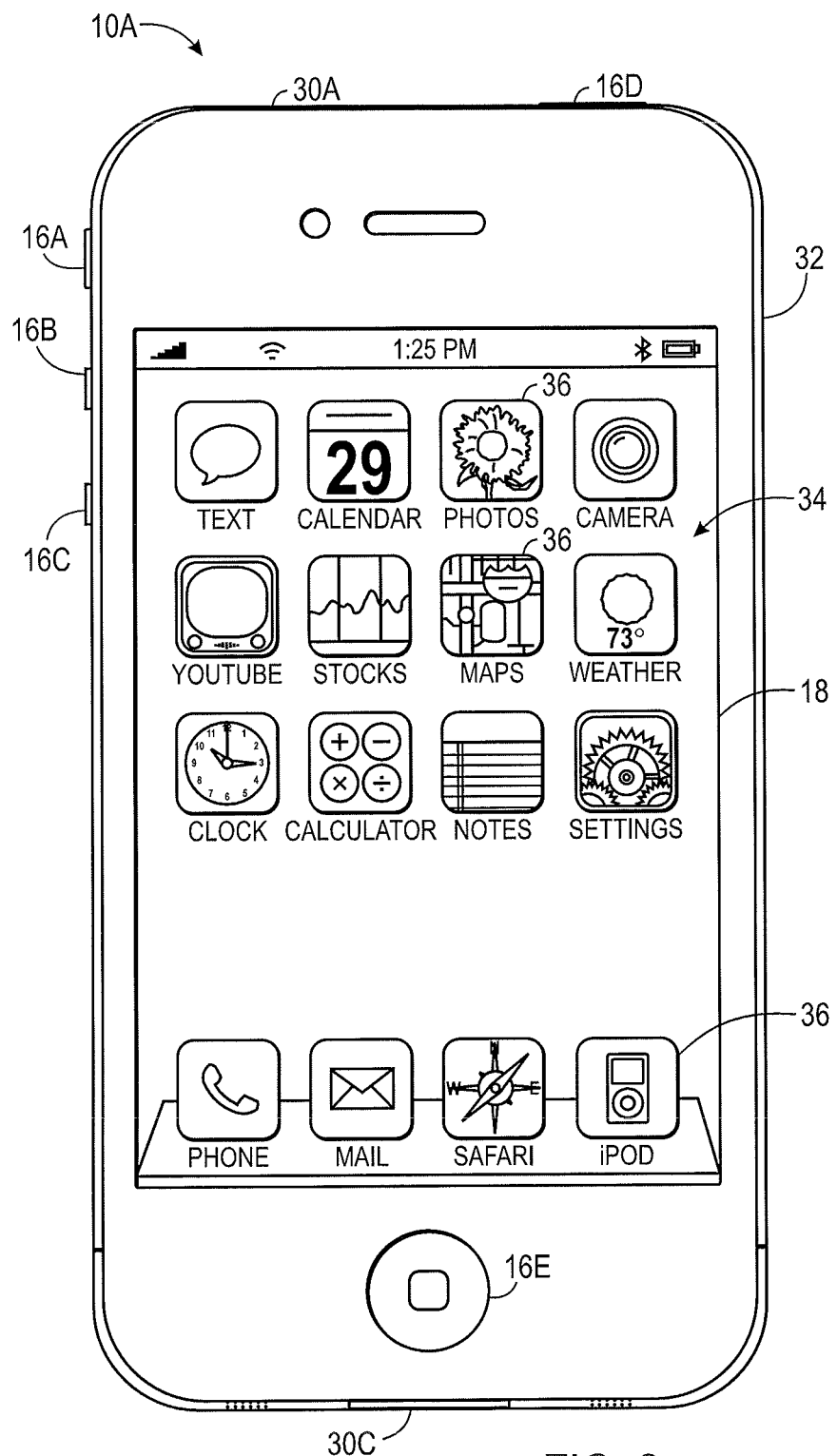
FIG. 2 is a front view of a handheld electronic device embodiment in accordance with present embodiments.
Figure 3:
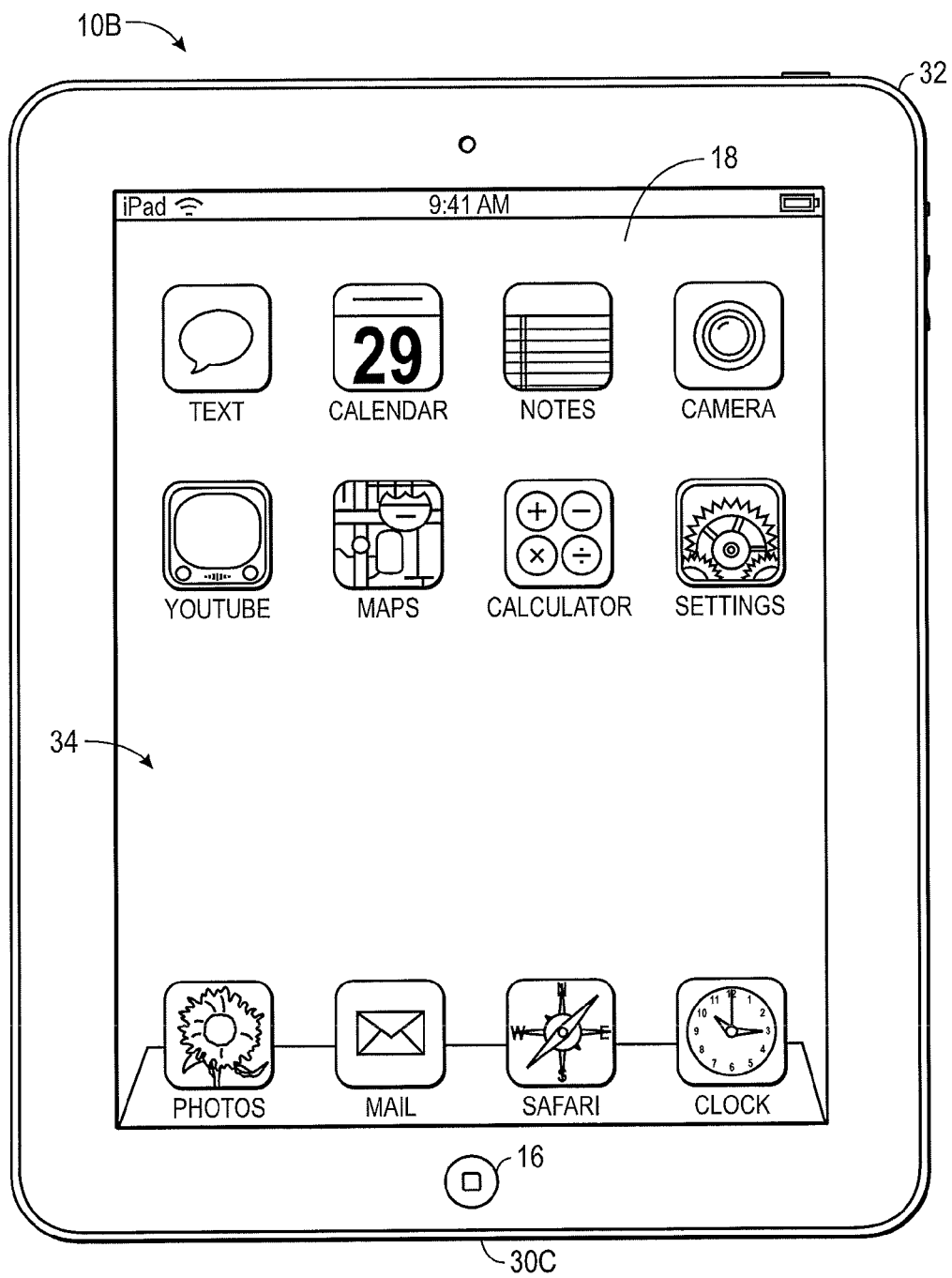
FIG. 3 is a front view of a tablet computer for use accordance with present embodiments.

With these foregoing features in mind, a general description of suitable electronic devices for implementing aspects of the present techniques is provided. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a tablet computer, is depicted. These types of electronic devices, and other electronic devices providing suitable storage and/or processing capabilities, may be used in conjunction with the present techniques. For example, these and similar types of electronic devices may implement non-alphanumeric, non-biometric authentication schemes to access hidden or confidential information or functions in accordance with the teachings of the present disclosure.

An example of a suitable electronic device may include various internal and/or external components which contribute to the function of the device. FIG. 1 is a block diagram illustrating the components that may be present in such an electronic device 10 and which may allow the device 10 to function in accordance with the techniques discussed herein. As will be appreciated, the various functional blocks shown in FIG. 1 may include hardware elements (including application specific or generic circuitry), software elements (including computer code or instructions stored on a non-transitory machine-readable medium) or a combination of both hardware and software elements. It should further be noted that FIG. 1 is merely one example of a particular implementation and is merely intended to illustrate the types of components that may be present in a device 10. For example, in the presently illustrated embodiment, these components may include a display 18, I/O ports 12, input displays 14, data processing circuitry, such as one or more processors 14, a memory device 20, a non-volatile storage 22, expansion card (s) 24, a networking device 26, and a power source 28.

With regard to each of these components, the display 18 may be used to display various images generated by the device 10. The display 18 may be any type of display such as a cathode ray tube (CRT), a liquid crystal display (LCD), a light emitting diode (LED) display, an organic light emitting diode (OLED) display, or other suitable display. In certain embodiments of the electronic device 10, the display 18 may include a touch-sensitive element, such as a touch screen, and may be used to perform methods of entering and saving authentication gestures.

The I/O ports 30 may include ports configured to connect to a variety of external devices, such as a power source or other electronic devices (such as handheld devices and/or computers, printers, projectors, external displays, modems, docking stations, and so forth). The I/O ports 30 may support any standard or proprietary interface type, such as a universal serial bus (USB) port, a video port, a serial connection port, an IEEE-1394 port, an Ethernet or modem port, and/or an AC/DC power connection port.

The input displays 16 may include the various devices, circuitry, and pathways by which input or feedback is provided to data processing circuitry, such as the processor 14. Such input displays 16 may be configured to control a function of the device 10 when actuated. For example, the input displays 16 may include buttons, sliders, switches, control pads, keys, knobs, scroll wheels, keyboards, mice, touchpads, and so forth. In certain embodiments, the input displays 16 may also include such components as global positioning system (GPS) circuitry and/or accelerometers that convey information about the location and/or orientation of the device 10 to the processor(s) 14.

In certain embodiments, an input structure 14 and display 18 may be provided together, such an in the case of a touch screen where a touch-sensitive mechanism is provided in conjunction with the display 18. In such embodiments, the user may select or interact with displayed interface elements via the touch-sensitive mechanism. In this way, the displayed user interface may provide interactive functionality, allowing a user to select, by touch screen or other input display, from among options displayed on the display 18.

User interaction with the input structure 14, such as to interact with a user or application interface displayed on the display 18, may generate electrical signals indicative of the user input. These input signals may be routed via suitable pathways, such as an input hub or bus, to data processing circuitry, such as the processor(s) 14, for further processing.

The processor(s) 14 may provide data processing capability to execute and support one or more operating systems, programs, user and application interfaces, software systems and applications, and any other functions of the electronic device 10. The processor(s) 14 may include one or more microprocessors, such as one or more "general-purpose" microprocessors, one or more special-purpose microprocessors and/or ASICS, a System-on-Chip (SoC) microprocessor, or some combination of such processing components and devices. For example, the processor 14 may include one or more reduced instruction set (RISC) processors, as well as graphics processors, video processors, audio processors and/or related chip sets.

The instructions or data to be processed by the processor(s) 14 may be stored in a memory 20. The memory 20 may be provided as a volatile memory, such as random access memory (RAM), and/or as a non-volatile memory, such as read-only memory (ROM). The memory 20 may store a variety of information and may be used for various purposes. For example, the memory 20 may store firmware executed by a processor 14 (such as basic input/output instructions or operating system instructions, including instructions implementing non-alphanumeric authentication (e.g., authentication not based on keys or characters found on a keyboard) as discussed herein), other programs that enable various functions of the electronic device 10, user interface functions, processor functions. In addition, the memory 20 and may be used for buffering or caching during operation of the electronic device 10.

The components may further include a non-volatile storage 22 for persistent storage of data and/or instructions. The non-volatile storage 22 may include flash memory, a hard drive, or any other optical, magnetic, and/or solid-state storage media. The non-volatile storage 22 may be used to store data files such as personal or business information (e.g., financial and other account information), software, wireless connection information (e.g., information that may enable the electronic device 10 to establish a wireless connection, such as a telephone or wireless network connection), and any other suitable data. In addition, the non-volatile storage 22 may also store code and/or data for implementing various functions of the electronic device 10, such as application or program code, data associated with such applications or programs, operating system code, user configured preferences, as well as code for implementing secure user authentication as discussed herein.

The embodiment illustrated in FIG. 1 may also include one or more card or expansion slots. The card slots may be configured to receive an expansion card 24 that may be used to add functionality, such as additional memory, I/O functionality, or networking capability, to the electronic device 10. Such an expansion card 24 may connect to the device through any type of suitable standard or proprietary connector, and may be accessed internally or external to the housing of the electronic device 10. For example, in one embodiment, the expansion card 24 may be flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 10 to communicate over a network, such as a Local Area Network (LAN), Wide Area Network (WAN), cellular network, or the Internet. Further, the electronic device 10 may connect to and send or receive data with any device on the network, such as portable electronic devices, personal computers, printers, and so forth. Alternatively, in some embodiments, the electronic device 10 may not include a network device 24. In such an embodiment, a NIC may be added as an expansion card 24 to provide similar networking capability as described above.

Further, the components may also include a power source 28. In one embodiment, the power source 28 may be one or more batteries, such as a lithium-ion polymer battery. The battery may be user-removable or may be secured within the housing of the electronic device 10, and may be rechargeable. Additionally, the power source 28 may include AC power, such as provided by an electrical outlet, and the electronic device 10 may be connected to the power source 28 via a power adapter. This power adapter may also be used to recharge one or more batteries if present.

With the foregoing in mind, FIG. 2 illustrates an electronic device 10 in the form of a handheld device 10A, here a cellular telephone, that may be used to store confidential personal and/or professional information and/or to execute routines to facilitate secure authentication in accessing such information or other secured features (network connections, applications, and so forth) of the device 10A. It should be noted that while the depicted handheld device 10A is provided in the context of a cellular telephone, other types of handheld devices (such as media players for playing music and/or video, personal data organizers, handheld game platforms, and/or combinations of such devices) may also be suitable be provided as the electronic device 10. Further, a suitable handheld device 10A may incorporate the functionality of one or more types of devices, such as a media player, a cellular phone, a gaming platform, a personal data organizer, and so forth.

For example, in the depicted embodiment, the handheld device 10A is in the form of a cellular telephone that may provide various additional functionalities (such as the ability to take pictures, record audio and/or video, listen to music, play games, and so forth). As discussed with respect to the generalized electronic device of FIG. 1, the handheld device 10A may allow a user to connect to and communicate through the Internet or through other networks, such as local or wide area networks or cellular networks. For example, the handheld device 10A may allow a user to communicate using e-mail, text messaging, instant messaging, or other forms of electronic communication. The handheld electronic device 10A, may also communicate with other devices using short-range connections, such as Bluetooth and near field communication. By way of example, the handheld device 10A may be a model of an iPod® or iPhone®, or a derivative thereof, available from Apple Inc. of Cupertino, Calif.

In the depicted embodiment, a housing 32 includes input displays 16 through which a user may interface with the device. Each input display 14 may be configured to help control a device function when actuated. For example, in a cellular telephone implementation, one or more of the input displays 16 may be configured to invoke a "home" screen or menu to be displayed, to toggle between a sleep and a wake mode, to silence a ringer for a cell phone application, to increase or decrease a volume output, and so forth.

A display 18 of the handheld device 10A may be used to display a graphical user interface (GUI) 34 that allows a user to interact with the handheld device 10A. The GUI 34 may include various layers, windows, screens, templates, or other graphical elements that may be displayed in all, or a portion, of the display 18. In certain embodiments, the GUI 34 may include a gesture entry screen to implement and facilitate the authentication and/or authorization of a user of the electronic device 10. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touch screen provided as the display 18 in certain embodiments, or may be selected by a user input display 14, such as a wheel or button In addition, the handheld device 10A may include data processing circuitry (such as one or more processors), network connectivity, memory, and storage capabilities, as described with respect to FIG. 1, which allow the handheld device 10A to store and execute the GUI or other applications suitable for implementing the present techniques. For example, the handheld device 10A may be configured to store and execute code suitable for accessing confidential information or secured applications or network connections using gestures input via a touch screen, a sequence of user selections of displayed objects, or other non-alphanumeric (e.g., non-keyboard), non-biometric inputs. Further, to the extent that the handheld device 10A has network connectivity, such connectivity may be utilized to update or modify an existing application or GUI on the handheld device 10A to provide such functionality, i.e., to update an operating system or software application to include new or modified functionality with respect to accessing secured data, applications, or connections on electronic devices.

In addition to handheld devices 10A, such as the depicted cellular telephone of FIG. 2, an electronic device 10 may also take the form of a computer or other types of electronic device on which confidential information might be stored and on which software code governing secure access to such information might be executed. Such computers may include computers that are generally portable (such as laptop, notebook, and tablet computers) as well as computers that are generally used in one place (such as conventional desktop computers, workstations and/or servers). In certain embodiments, the electronic device 10 in the form of computer may be a model of a MacBook®, MacBook® Pro, MacBook Air®, iMac®, Mac® mini, or Mac Pro® available from Apple Inc.

By way of example, a tablet computing device 10B embodiment of the electronic device 10 is illustrated in FIG. 3. The depicted tablet computing device 10B includes, a housing 32 includes a display 18, input displays 16, and input/output ports 30C. The input displays 16 (such as one or more pushbuttons and touchpad) may be used to interact with the tablet computing device 10, such as to start, control, or operate a GUI or applications running on the tablet computing device 10. For example, the touchpad may allow a user to navigate a user interface or application interface displayed on the display 18. In addition, the input and output ports 30C may allow connection of additional devices. For example, the tablet computing device 10B may include an I/O port 30C, such as a USB port or other port, suitable for connecting to another electronic device, such as a handheld device 10A.

In addition, as discussed with respect to the handheld device 10A, the tablet computing device 10B may include data processing circuitry (such as one or more processors), network connectivity, memory, and storage capabilities that allow the tablet computing device 10B to store and execute a GUI and other applications suitable for implementing the present techniques. For example, the tablet computing device 10B may be configured to store and execute programming code encoding routines suitable for accessing confidential information or secured applications or network connections using non-alphanumeric and non-biometric inputs (e.g., gestures, sequences, and so forth). Further, to the extent that a tablet computing device 10B has network connectivity, such connectivity may be utilized to update or modify an existing application on the tablet computing device 10B to provide such functionality.

In certain embodiments, the tablet computing device 10B may provide the functionality of more than one type of electronic device, such as a device incorporating the functionality of two or more of a media player, a web browser, a cellular phone, a gaming platform, a personal data organizer, and so forth. For example, in the depicted embodiment, the tablet computing device 10B may provide various additional functionalities, such as the ability to display information, take pictures and record audio and/or video listen to music, play games, and so forth. By way of example only, the tablet computing device 10B may be a model of an iPad® tablet computer, available from Apple Inc.

With the foregoing discussion in mind, it may be appreciated that an electronic device 10 in either embodiment of a handheld device 10A or a tablet computing device 10B may be suitable for storing confidential or hidden information and providing user authentication via non-alphanumeric, non-biometric inputs or gestures as described herein. Accordingly, as used herein, the term "authentication" may refer to a system or process in which a supporting system or device (e.g., electronic device 10) securely identifies the user of the system or device prior to granting access to confidential information. Similarly, as used herein, the term "authorization" may refer to a system or process in which a supporting system or device (e.g., electronic device 10) determines the extent or level of access to confidential information an authenticated user should be allowed. The term "gesture" can be understood to encompass the movement of one or more fingers across or along a touch-sensitive display or device (e.g., display 18), such as to move along a path, draw a pattern or shape, move a displayed virtual object, and so forth. Accordingly, the term "gesture," as will be further appreciated, can therefore be understood to be distinct from the simple act of touching the touch-sensitive display, such as a touch screen or touch pad, at a single point or without movement along the surface of the touch-sensitive display, as may occur when a button, icon, or object is typically selected using a touch-sensitive display. Thus, in certain embodiments, a gesture can be understood to include one or more gesture strokes (or one or more finger touch travel paths). Though specific examples of the use of one type of electronic device or another might be described or discussed herein as storing confidential information or as providing user authentication and/or authorization via gesture, sequence, or other non-alphanumeric, non-biometric input, such discussion is intended as an example only and should not be construed as limiting or as indicative of a preference of one implementation over another. Instead, it should be understood that any suitable electronic device 10 (whether a portable handheld electronic device 10A, portable tablet computing device 10B, or other type of device) configured to store confidential information, and receive non-alphanumeric and non-biometric inputs that may be used to perform these respective functions in the various implementations described herein.

In certain embodiments, gestures are user definable, in which a user can define or configure the gesture, and are generated and entered by the user when prompted, such as when designating data or a function as having restricted access. That is, the act of designating data or a function as having restricted access may invoke an gesture entry routine (as opposed to a password or PIN entry routine) in which the user performs the desired gesture. As will be further appreciated, the user may enter and save a gesture to restrict access to confidential data or functions to only an authenticated and/or authorized user.

For example, in one implementation, code or instructions stored and/or executed on a handheld device 10A or tablet computing device 10B may be used to invoke display of one or more authentication screens, which may include at least gesture entry screen. The gesture entry screen may be part of an authentication and/or authorization system, which in turn allows a user to enter and save a gesture to restrict access to otherwise unavailable (e.g., confidential, hidden, and so forth) data or functions (e.g., applications or network connections).

Figure 4:
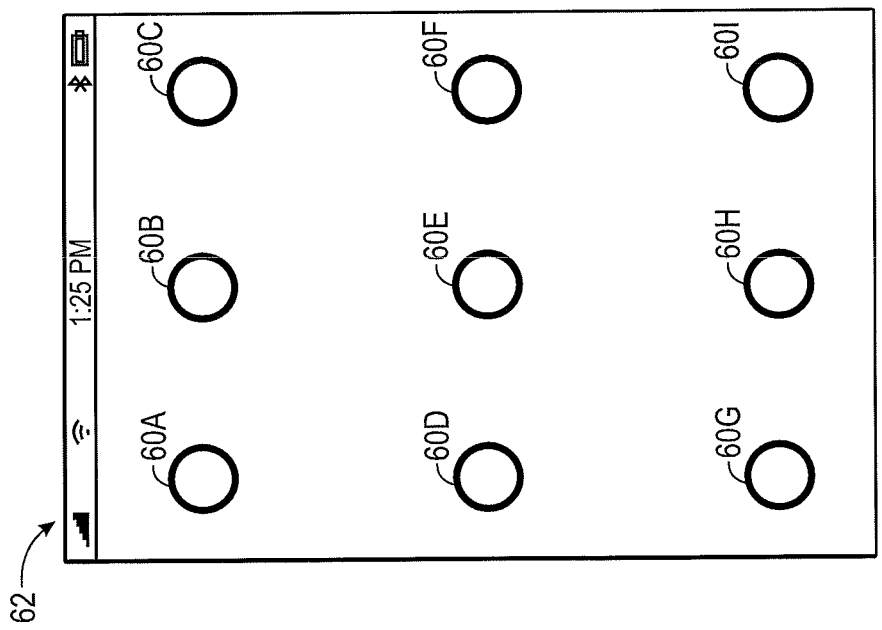
FIG. 4 depicts a gesture entry screen in accordance with present embodiments.

In certain embodiments, as depicted in FIG. 4, an implementation of an gesture entry screen 62 for use with gestures is depicted with respect to the display 18 (e.g., touch-sensitive display) of the electronic device 10. The gesture entry screen 62 may include an array of selectable graphical elements 60A, 60B, 60C, 60D, 60E, 60F, 60G, 60H, 60I, which may each serve as initiation and/or destination locations for user gestures. As will be appreciated, though the depicted example employs graphical elements that are circular in shape, other shapes of touch sensing areas (e.g., triangular, square, star-shaped, and so forth) suitable for marking a location on the touch-sensitive display 18 may be employed. Likewise, though a 3×3 grid is depicted, other sizes and shapes of grids of graphical elements 60A-60I may be displayed, e.g., 2×2, 2×3, 3×4, 4×4, 5×5, and so forth. In some embodiments, the graphical elements 60A-60I may be randomly arranged on the gesture entry screen 62, or may be customized (e.g., arranged by the user) to the preference of the user. Further, the size of the graphical elements 60A-60I may vary in different implementations to represent the tolerance and/or precision associated with the gesture. For example, larger graphical elements 60A-60I may be associated with greater tolerance in evaluating a gesture or vice versa. It should be further appreciated that the gesture entry screen 62 may also include one or more invisible touch sensing areas instead of or in addition to the visibly displayed graphical elements 60A-60I. For example, in one embodiment, the gesture entry screen 62 may display no visible graphical elements 60A-60I, but instead may allow a user to enter a gesture over one or more preferred display images (e.g., photos) or over a dark display screen.

Figure 5:
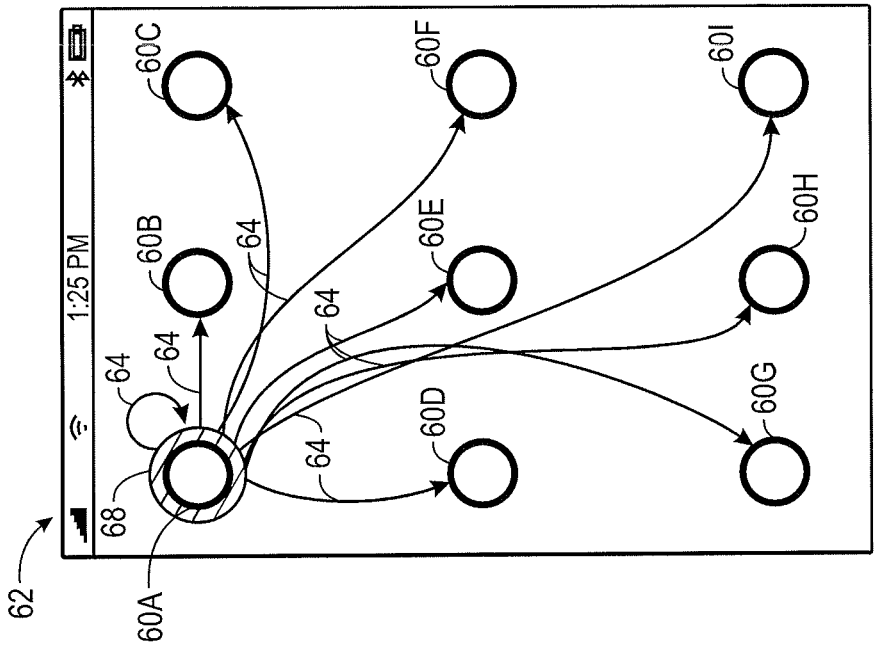
FIG. 5 depicts an example of entered gestures on the gesture entry screen of FIG. 4 in accordance with present embodiments.

Referring to FIG. 5, in certain embodiments, a user may enter a gesture using one or more gesture strokes 64. The gesture strokes 64 may begin and end at any one of the graphical elements 60A-60I, including beginning and ending at the same graphical element, for example, by using a small circular gesture or similar gesture that returns to the initial graphical element. As discussed above, the path a finger travels between one or more of the graphical elements 60A-60I may also constitute a gesture evaluated to authenticate and/or authorize a user. For example, in one embodiment, the gesture strokes 64 may include a user moving one or more fingers across the surface of the display 18 (e.g., touch-sensitive display) to invoke an authentication routine, for example, by performing a gesture on the gesture entry screen 62. Thus, as implemented as an input to the electronic device 10, a gesture may be described by a sequence of locations (e.g., a series of coordinates) input via a user touching the display 18. As discussed herein, such a sequence of locations may include more than one location being input concurrently. That is, a multi-touch may be implemented by the user, in which more than one finger may be involved in making a gesture on the display 18 at any given time.

Further, a sequence of locations may be defined not only by location in space, or where the contact is occurring, but by respective timing, or when the contact or movement is occurring. In this way, the velocity or acceleration of the finger or fingers on the touch-sensitive display 18 or the addition or removal of fingers involved in the gesture at a particular point in time may define the gesture. Likewise, in certain embodiments, pauses may be incorporated into the gesture such that a gesture is evaluated based on whether the pauses are present at particular times when tracing the gesture.

Thus, as an input, a gesture may be understood to encompass sequential locations or positions (e.g., coordinates) identified by the movement of a finger or fingers on a touch-sensitive display 18. The input associated with such a gesture may also include a temporal component that may be evaluated separately from the spatial component (i.e., the movement of a second finger is included or removed from the gesture movement at a particular point in time) or may be evaluated in conjunction with the spatial component (i.e., the velocity and/or acceleration of the finger when moving across the touch-sensitive display may constitute part of the gesture).

As will be discussed in greater detail below, an input associated with one or more gesture strokes 64 may be further characterized by other factors. For example, the total distance traveled by a finger in performing one or more gesture strokes 64 may be a factor used to characterize the gesture. That is, two different gesture strokes 64 may begin and end at the same points on a touch-sensitive display such as the display 18, but may travel different paths of different lengths in moving between the otherwise identical beginning and ending locations. In such a context, the actual path traced or the distance traveled may be used to characterize the authentication gesture. Likewise, the direction of a movement may be used to characterize the authentication gesture. For example, a clockwise circular motion and a counterclockwise circular motion may start and stop at the same locations and may involve a movement of the same distance. However, such complementary movements may be distinguished based on the directionality of the motion in addition to the actual path traveled.

Further, in certain embodiments, the speed at which all or part of the authentication gesture is executed, or the speed at which the path or paths are traveled between graphical elements 60A-60I, may constitute part of the gesture that is estimated or evaluated. For example, the gesture may be authenticated if performed at a certain speed or range, or if certain gesture strokes 64 of the gesture are performed at one speed while other gesture strokes 64 of the gesture are performed at a different speed. As will be discussed in greater detail, in such an embodiment, a visible trace or color illuminated trail may be displayed on the gesture entry screen 62(such as a colored circle or trail centered on the moving fingertip) which changes color, shading or hatching based on the speed of the fingertip motion.

As an example of various gesture stokes 64, and by extension various potential gestures, as depicted in FIG. 5, a user may begin a gesture at a first graphical element 60A, as shown by finger contact disc 68 overlying the first touch area 60A. As depicted by the gesture strokes 64, the user may perform all or part of a gesture by moving his or her finger, while in contact with the display 18, to any of the graphical elements (e.g., 60B-60I), including the first graphical element 60A, as well as any invisible touch sensing area of the authentication screen 62. Thus, in the depicted example a simple gesture from a first graphical element to a second graphical element, excluding path, speed, distance, and so forth, may yield at least 81 (i.e., 9×9 touch sensing areas) possible combinations. Accordingly, each additional graphical element (e.g., 60A-60I) added to the authentication gesture may increase the number of possible combinations by a factor of 9. For example, an gesture moving from a first to a second to a third graphical element (e.g., 60A to 60B to 60C) may have 729 combinations, while a fourth graphical element (e.g., 60A to 60B to 60C to 60D) may yield 6,561 combinations, and so forth.

Figure 6:
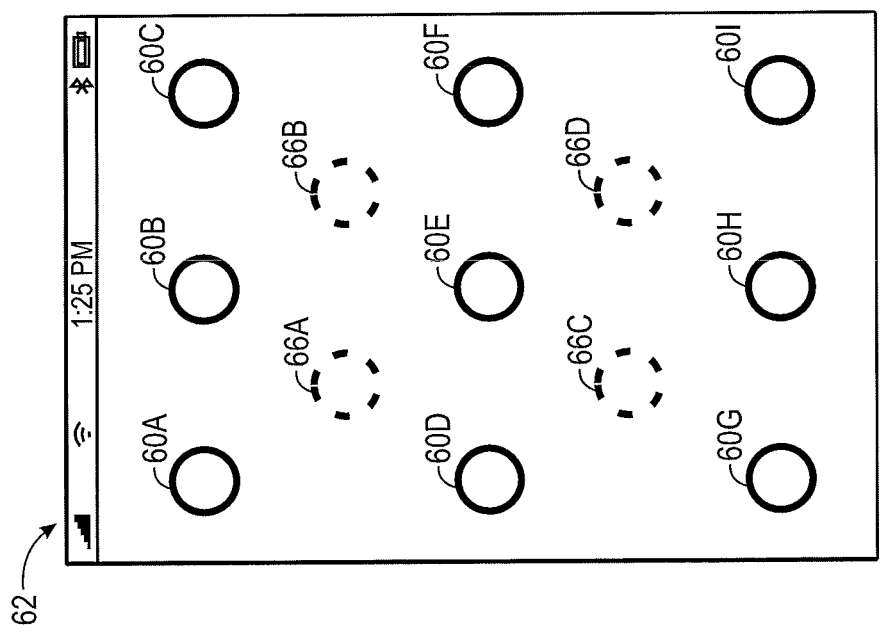
FIG. 6 depicts a 2×2 array of hidden dots on the gesture entry screen of FIG. 4 in accordance with present embodiments.

As previously noted, in certain embodiments, the gesture entry screen 62 may, in addition to the visible selectable graphical elements 60A-60I, include an array of invisible touch-sensing areas. As will be discussed in greater detail, in one embodiment, the invisible touch-sensing areas may include an array of hidden dots 66, while in another embodiment the invisible touch-sensing areas may include an array or arrangement of crossing and connecting hidden lines. Nevertheless, the invisible touch-sensing areas may allow a user, for example, to perform gestures that include traveling a detected path along, between, near, or around the visible graphical elements 60A-60I. For example, as depicted in FIG. 6, the hidden dots 66A-66D may each be interspersed between and around the visible selectable graphical elements 60A-60I. In a further example, again referring to FIG. 6, the hidden dots 66A, 66B, 66C, and 66D may each be positioned substantially at the center of any two or more graphical elements 60A-60I in any direction. It should also be appreciated that, although displayed as a 2×2 array, the hidden dots 66 (e.g., dots 66A-66D) may be arranged in any size array (e.g., 3×3, 4×4, 5×5, and so forth). Further, the hidden dots (e.g., hidden dots 66A-66D) may be spaced in an arrangement that allows a user to perform one or more gesture strokes 64 and complete a gesture entry by either touching no visible graphical elements 60A-60I, or by traveling a path from a first desired graphical element (e.g., graphical element 60A) to any other graphical element in the array of visible graphical elements 60A-60I.

Figure 7:
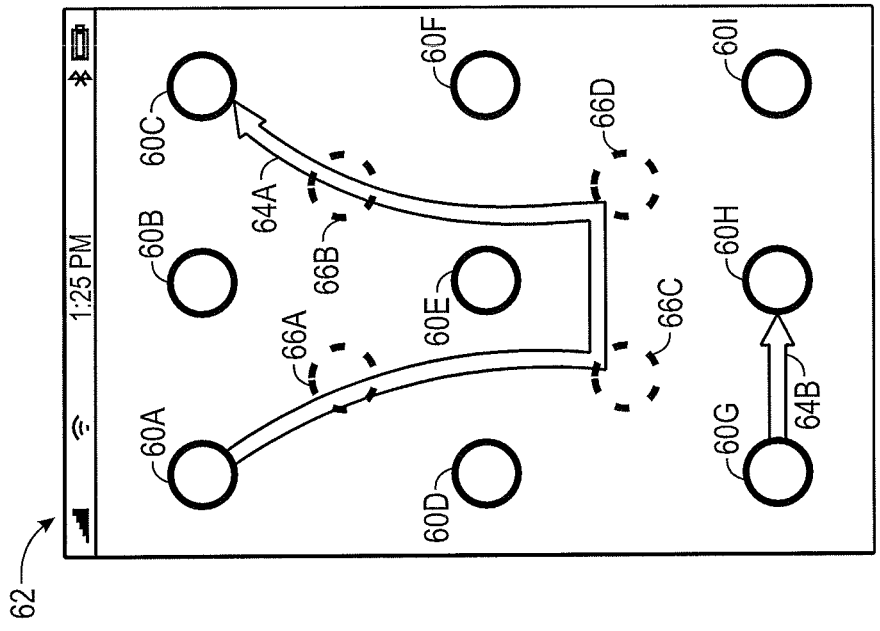
FIG. 7 depicts an example of an entered gesture on the gesture entry screen of FIG. 6 in accordance with present embodiments.

For example, as depicted in FIG. 7, a first gesture stroke 64A may be performed by traveling from graphical element 60A through hidden dots 66A, 66C, 66D to 66B, and then to graphical element 60C. Continuing, a second gesture stroke 64B may be performed concurrently with gesture stroke 64A as multi-touch gesture, for example, by using one finger to perform gesture stroke 64A and another finger to perform gesture stroke 64B at substantially the same time. Otherwise, the second gesture stroke 64B may be performed subsequent to performing gesture stroke 64A, for example, by using the one finger to perform gesture stroke 64A, and lifting the one finger to perform gesture stroke 64B.

Without the currently disclosed techniques, to perform certain gestures (e.g., gestures strokes 64A and 64B of FIG. 7), a user could travel in only direct paths through intervening graphical elements 60A-60I. That is, the path the user traveled from one graphical element (e.g., 60A-60I) to another graphical element (e.g., 60A-60I) would be inconsequential, as the electronic device (e.g., electronic device 10) could only detect paths through intervening graphical elements 60A-60I. For example, to perform a gesture stroke 64 from graphical element 60A to element 60C, the electronic device would detect that the user traveled a path through the intervening graphical element 60B. However, the presently disclosed embodiments allows the user to perform gestures (e.g., multi-touch, double touch, drag, flick, rotate, etc.) by traveling any desired path from graphical element (e.g., 60A-60I) to graphical element (e.g., 60A-60I), as the path traveled through touch-sensing areas (e.g., hidden dots 66 and/or hidden lines) is detected as part of the entered gesture. For example, again referring to FIG. 7, the gesture stroke 64A is performed by traveling from graphical element 60A through hidden dots 66A, 66C, 66D to 66B, and then to graphical element 60C. Thus the possible combinations of gesture entries and potential gesture strength are increased. Similarly, as previously noted, the user may likewise enter a complete gesture by traveling only through touch-sensing areas (e.g., hidden dots 66 and/or hidden lines) between, but not touching, any of the graphical elements 60A-60I.

Similar to FIG. 6, FIG. 8 depicts an embodiment of the gesture entry screen 62 including a 3×3 array of visible graphical elements 60A-60I and a 4×4 array of invisible hidden dots 66A-66P. As previously noted, and also depicted in FIG. 8, the hidden dots 66 (e.g., hidden dots 66A-66P) may be interspersed or scattered among the visible graphical elements 60A-60I. As also noted above with respect to FIG. 5, in such an embodiment, additional graphical elements 60A-60I and/or hidden dots 66A-66P added to the authentication gesture may increase the total number of possible gesture combinations by factors of 9. Accordingly, by including a 4×4 array of hidden dots 66A-66P, the possible combinations of gesture entries may be further increased, and by extension, gesture authentication strength and complexity may be further increased.

Depicted in FIG. 9 is an example of a gesture performed through the 3×3 array of visible graphical elements 60A-60I and the 4×4 array of invisible hidden dots 66A-66P. As illustrated, a user may perform a gesture stroke 64A by making one or more circular paths through hidden dots 66A, 66E, 66F, 66B and around graphical element 60A. Particularly, it should be appreciated that the circular paths through the hidden dots (e.g., 66A, 66E, 66F, 66B) and around graphical element 60A may represent multiple (e.g., 2, 3, 4, 5, 6, and so forth) circle paths around the graphical element 60A, thus increasing the strength and complexity the gesture. Further, the user may perform gesture strokes 64B (e.g., traveling a path from hidden dot 66F through graphical elements 60E and 60I) and 64C (e.g., traveling a path from graphical element 60G through graphical elements 60H and 60I) as single or multi-touch gestures strokes 64. As will be further appreciated, such a gesture may be estimated as a strong gesture, and saved to be used for the purpose of user authentication and/or authorization.

Figure 10:
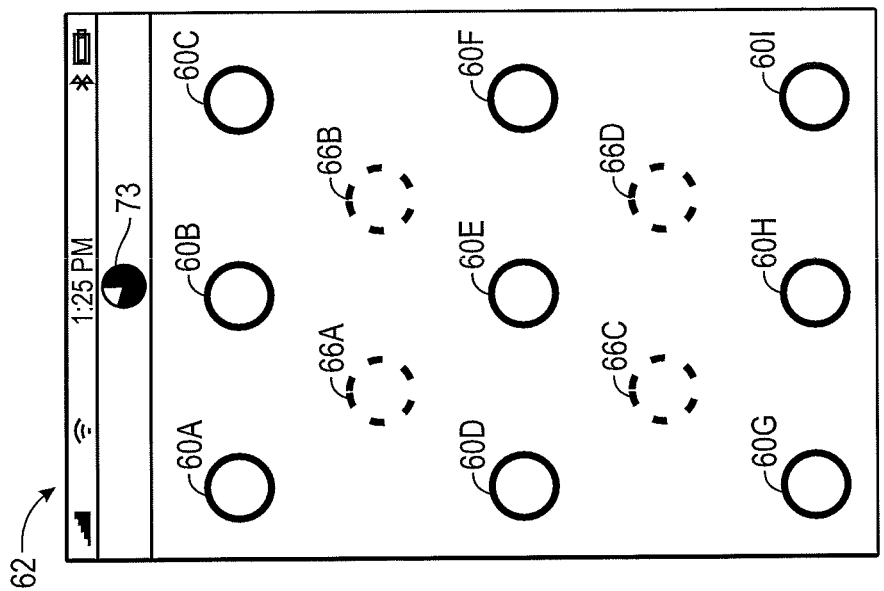
FIG. 10 depicts a timer indicator on the gesture entry screen of FIG. 4 in accordance with present embodiments.

In certain embodiments, the authentication screen or gesture entry screen 62 may also include a timer indicator 73, as depicted in FIG. 10. The timer indicator 73 may indicate a time elapsed while the user enters a gesture. For example, the elapsed time indicated by timer indicator 73 may be based on the time it takes to travel a number of graphical elements 60A-60I, hidden dots 66A-66D and/or hidden lines, or combinations of graphical elements 60A-60I and hidden dots 66A-66D and/or hidden lines the user touches. Alternatively the elapsed time indicated by the timer indicator 73 may be based on the total distance traveled for each gesture stroke 64 performed by the user. In one embodiment, the timer indicator 73 may allow a user to view a specified amount of time he or she should be allotted to complete a gesture. For example, a user may set and save the allotted time for entering a gesture to, for example, 10 seconds. In such the case, each subsequent time the user enters a gesture, the timer indicator 73 may display a 10-second time revolution. In certain embodiments, the strength of a gesture may be based on a specified allotted time.

Figure 11:
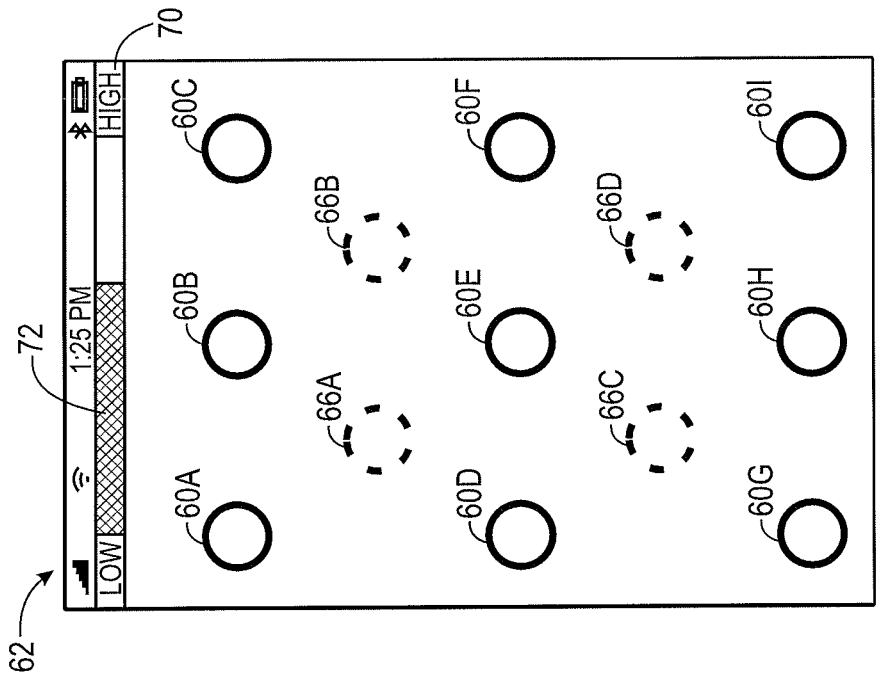
FIG. 11 depicts a strength estimation indicator on the gesture entry screen of FIG. 4 in accordance with present embodiments.

In certain embodiments, the gesture entry screen 62 may further include a gesture strength estimation indicator 70. As depicted in FIG. 11, the gesture strength estimation indicator 70 may include a progress bar 72 that may indicate to a user the strength (or the measure of length, complexity, unpredictability, entropy or randomness, general security, and so forth) of a gesture (e.g., a collection of gesture strokes 64) being entered or having been entered by the user. The progress bar 72 of the gesture strength estimation indicator 70 may range or extend from a "Low" end of the gesture strength estimation indicator 70 to a "High" end (e.g., transition from empty to full) of the indicator 70 in proportion to the strength of the gesture entered by the user. For example, the progress bar 72 may extend a proportional percentage (e.g., 10% extension to 100% extension) to indicate a weak, medium, or strong entered gesture. The progress bar 72 of the gesture strength estimation indicator 70 may further display varying colors in proportion to the strength of the gesture entered by the user. For example, the color red may indicate a weak gesture, yellow a gesture of medium strength, while green may indicate a strong gesture.

As it may be worth noting, the extension and/or variation in color of progress bar 72 may each either concurrently indicate gesture strength or each sequentially indicate gesture strength. For example, the progress bar 72 may extend in 10 percent increments from "Low" to "High" while concurrently displaying varying colors (e.g., red, orange, yellow, green, etc.) to indicate gesture strength. However, in certain embodiments, the progress bar 72 may extend in 10 percent increments up to 100 percent, and subsequently display varying colors (e.g., red, orange, yellow, green) to indicate an even stronger gesture.

Figure 12:
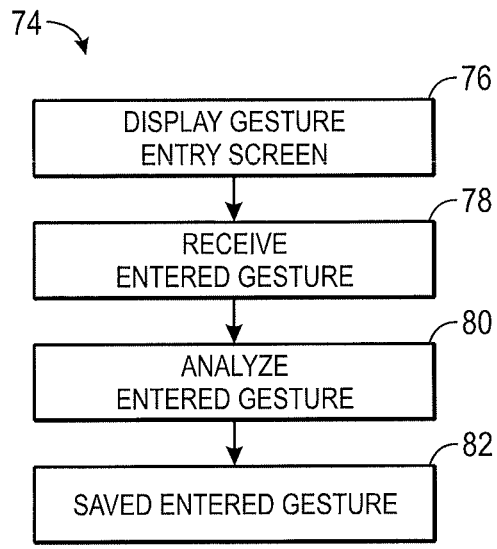
FIG. 12 is a flowchart of an embodiment of a process suitable for entering a gesture to authenticate a user, in accordance with present embodiments.

Turning now to FIG. 12, a flow diagram is presented, illustrating an embodiment of a process 74 performed by a device, such as the device 10, that may be useful in displaying a gesture entry screen 62, and receiving, analyzing, and storing an entered gesture for the purpose of user authentication and/or authorization. Further, for the purpose of illustration, FIGS. 13-17 will be discussed as example embodiments of the process 74 of FIG. 12. The process 74 may include code or instructions stored in a non-transitory machine-readable medium (e.g., the memory 20) and executed, for example, by the processor(s) 14. The gesture entry screen 62 may allow a user of electronic device 10, for example, to enter a unique or desired gesture using a array of displayed graphical elements (e.g., graphical elements 60A-60I), a array of invisible touch-sensing areas (e.g., hidden dots 66 and/or hidden lines 94), or a combination of visible graphical elements and invisible touch-sensing areas by employing any number of gestures (e.g., single touch, double touch, drag, flick, multi-touch, rotate, pinch, zoom, etc.).

Figure 13:
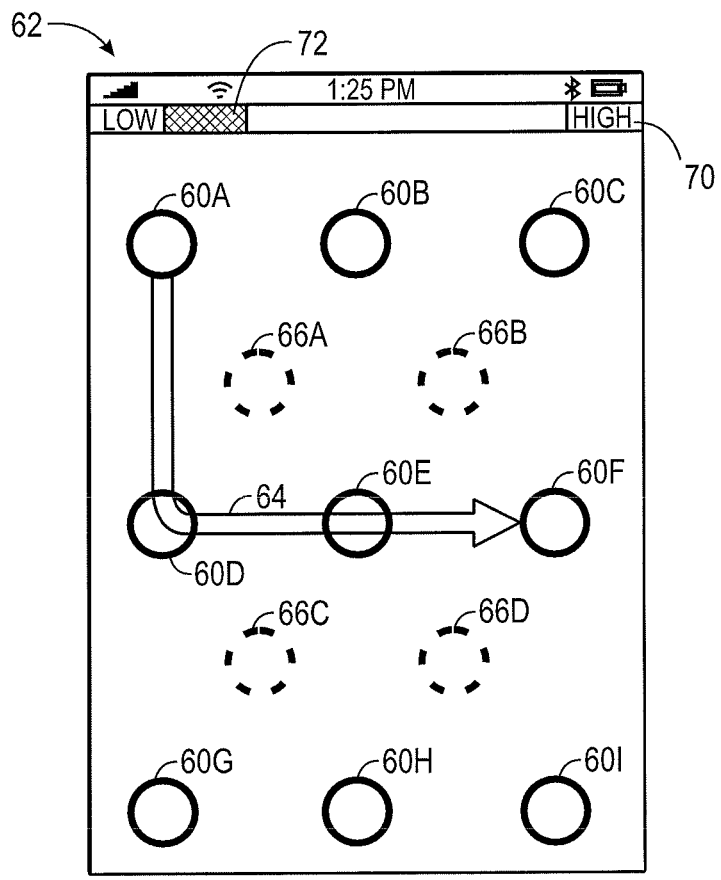
FIGS. 13-13E depict examples of an entered gestures through hidden dots and corresponding strength estimation indicator on the gesture entry screen of FIG. 4 in accordance with present embodiments.
Figure 13B:
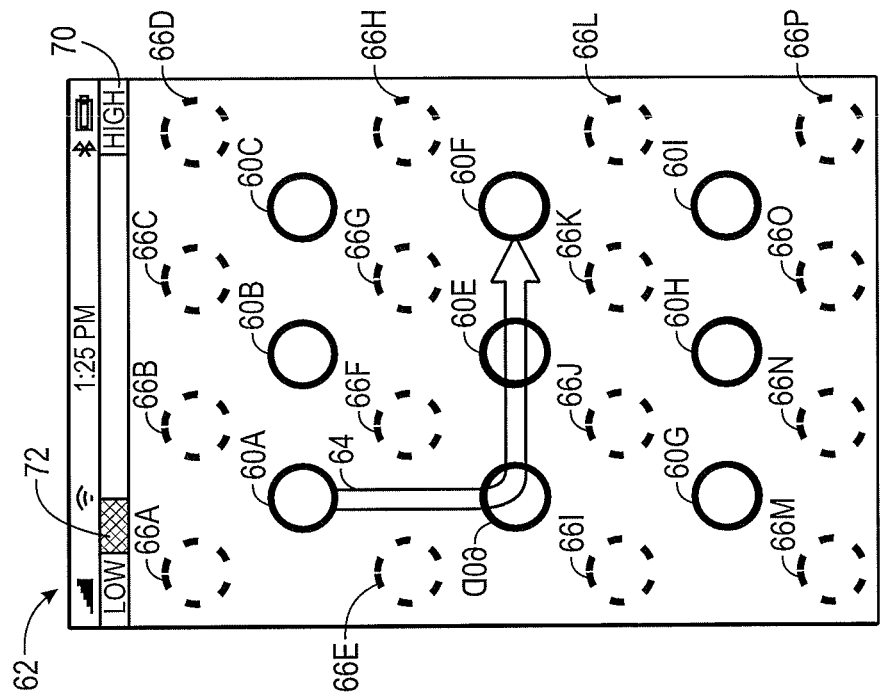

The process 74 may begin with the electronic device 10 displaying (block 76 of FIG. 12) the gesture entry screen 62. For example, the gesture entry screen may appear as depicted in FIG. 13. Although not shown, the user may see one or more instructional and selectable screen elements, prompting the user to enter and save a discretionary gesture. The user may then view the gesture entry screen 62, which, as previously noted with respect to FIG. 4, may include an array of visible graphical elements 60A-60I and/or an array of invisible touch-sensing areas (e.g., hidden dots 66A-66D). The electronic device 10 may then receive (block 78) and analyze (block 80) an estimated gesture entered by the user. For example, as depicted in FIG. 13, the user may see a strength estimation indicator 70 and progress bar 72, indicating to the user the strength of the gesture estimated and analyzed as the user performs one or more gesture strokes 64 to enter a gesture. As previously noted, the progress bar 72, for example, may both extend from the "Low" end to the "High" end (e.g., transition from empty to full) of the strength estimation indicator 70, as well as display varying colors (e.g., red, orange, yellow, green, and so forth) to indicate gesture strength based on an estimate of the entered gesture while the user enters a desired gesture. Upon entering a desired gesture of strong strength, the user may then elect to save (block 82) the entered gesture for later utilization to authenticate and/or authorize, for example, a user of the electronic device 10.

For the purpose of further illustration, various examples of entered gestures and corresponding gesture strength estimation indicators 70 are depicted in FIGS. 13A-13E. As previously discussed, the gesture entry screen 62 supported by processor(s) 14 of electronic device 10 may assign strength or weights to particular gestures based on the number of graphical elements 60A-60I touched by the user, the number of hidden dots 66 (e.g., hidden dots 66A-66P) touched by the user, the number of combinations of graphical elements 60A-60I and hidden dots 66 touched by the user, or the type of gesture performed (e.g., a double touch gesture may be assigned more strength than single touch and drag gestures, while rotate and zoom gestures may be assigned more strength than a double touch, and so forth) by the user. However, in particular, more strength or greater weight may be assigned based on the path traveled over invisible touch-sensing areas (e.g., hidden dots or hidden lines), as the complexity and entropy of the possible combinations of gesture entries may be markedly increased.

Figure 13A:
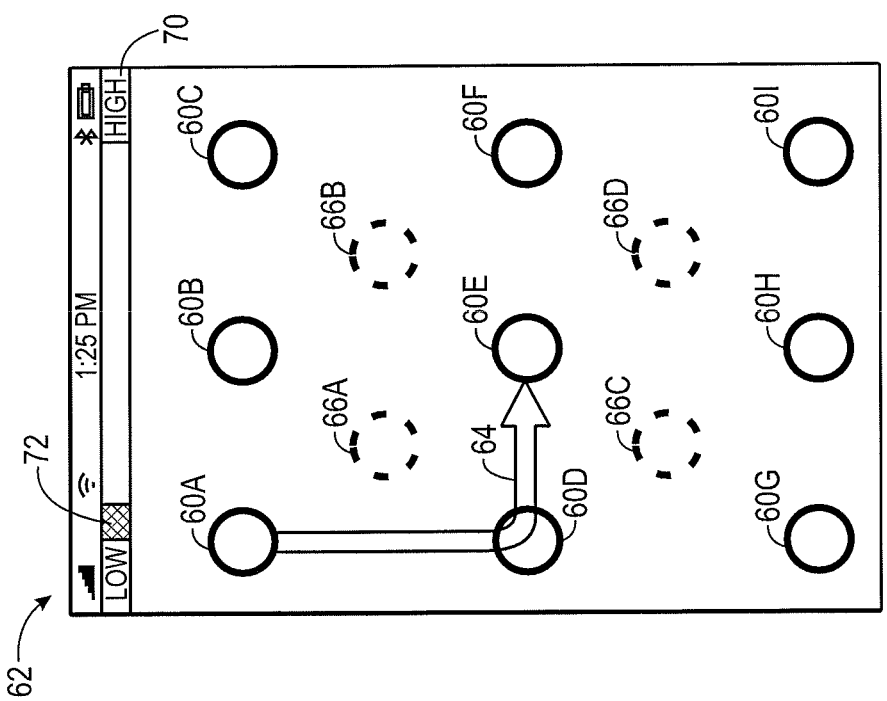

For example, FIG. 13A displays a relatively simple gesture input (e.g., gesture stroke 64) traveling directly from graphical element 60A to the column-adjacent graphical element 60D, and then directly to the neighboring graphical element 60E. Accordingly, the gesture strength estimation indicator 70 may indicate a weak gesture, displaying, for example, a red, only 10% extended progress bar 72. Similarly, FIG. 13B displays a 4×4 array of hidden dots 66A-66P, but the gesture stoke 64 travels a path only through neighboring graphical elements 60A, 60D, 60E, and 60F. This may be indicated by the strength estimation indicator 70 to be a weak gesture entry, as the user fails to travel through any of the available invisible hidden dots 66A-66P. FIG. 13C displays a slightly longer or stronger gesture, traveling a path (e.g., gesture stroke 64A) from graphical element 60A through elements 60D and 60E to element 60F. Another path (e.g., gesture stroke 64B), which may, for example, be performed as a double touch or concurrently as a multi-touch gesture, is traveled from graphical element 60H to element 60G. Accordingly, the progress bar 72 may be extended to a greater length, for example, and may display an orange or similar medium (e.g., between red and green) color.

Figure 13D:
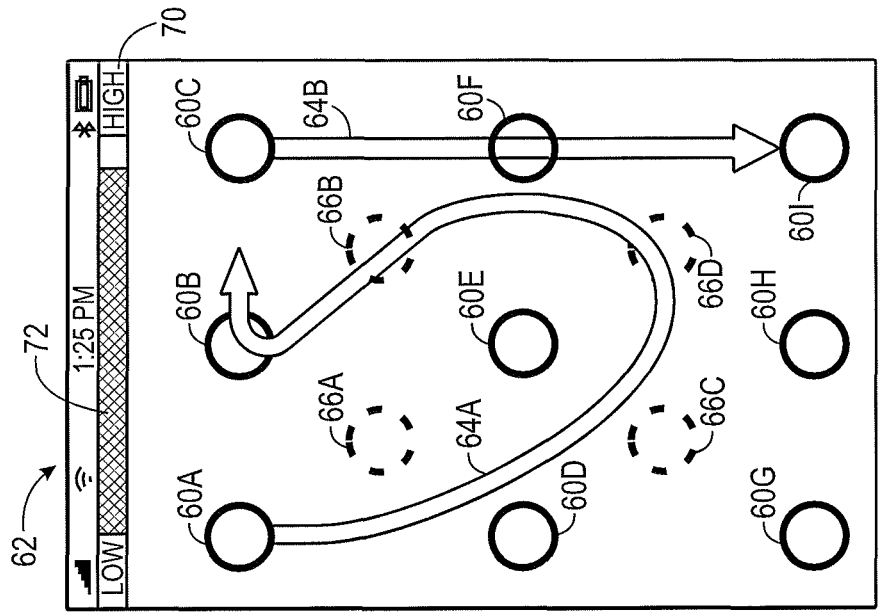
Figure 13C:
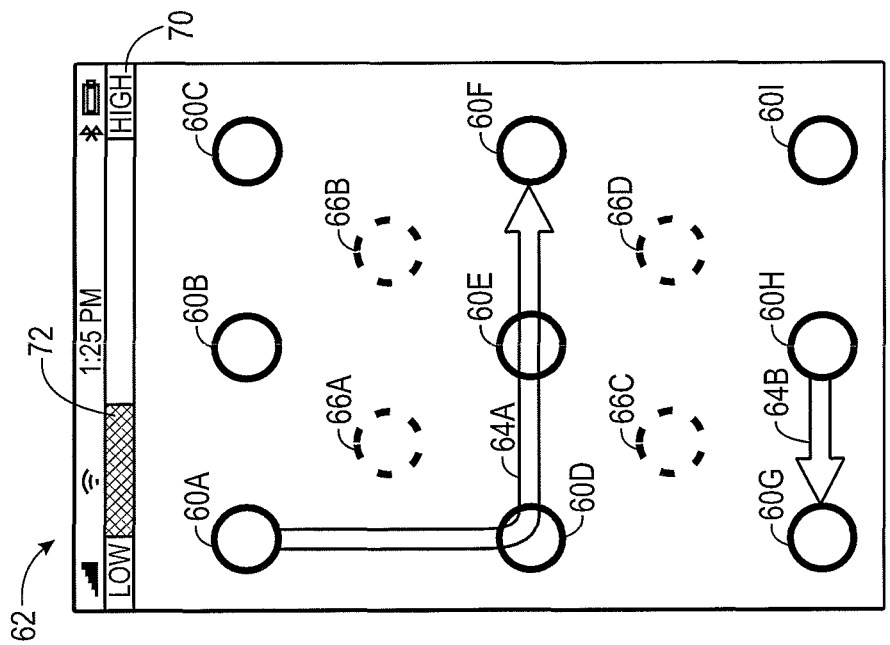

In contrast, FIG. 13D displays a much stronger gesture, in that the gesture stroke 64A travels a path from graphical element 60A to the adjacent graphical element 60B by looping around graphical element 60E through hidden dots 66D and 66B. Continuing, the gesture stroke 64B travels a path directly from graphical element 60C to graphical element 60I, which again may be performed concurrently with gesture stroke 64A or subsequent to performing gesture stroke 64A. As a result, gesture strength estimation indicator 70 may indicate a strong gesture input, displaying, for example, a green, nearby fully-extended progress bar 72. Lastly, FIG.

13E displays a gesture stroke 64 traveling a path from hidden dot 66A through hidden dots 66F and 66G, and ending at hidden dot 66D. Accordingly, similar to FIG. 13D, the gesture strength estimation indicator 70 may indicate a strong gesture input, displaying, for example, a green, nearby fully-extended progress bar 72.

Figure 14A:
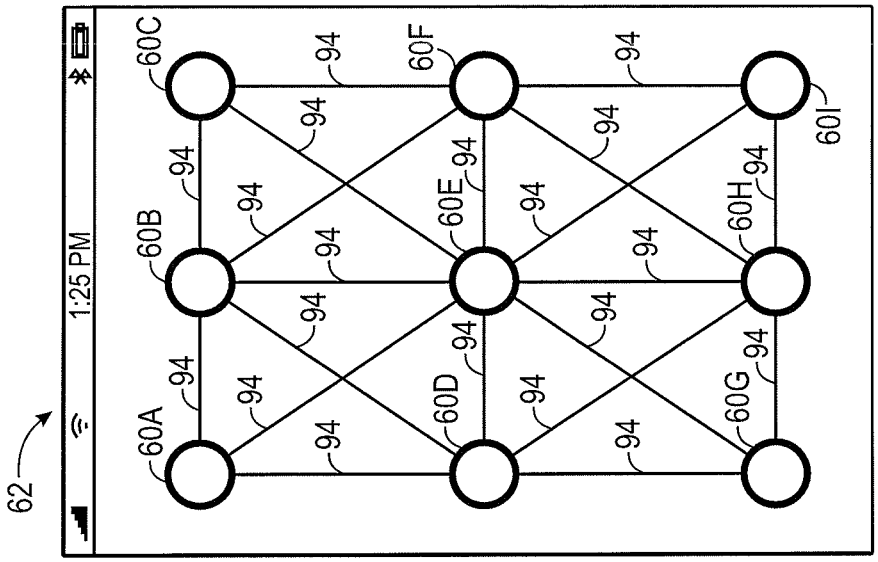
FIGS. 14A-14H depict examples of an entered gesture through hidden lines on the gesture entry screen of FIG. 4 in accordance with present embodiments.
Figure 13E:
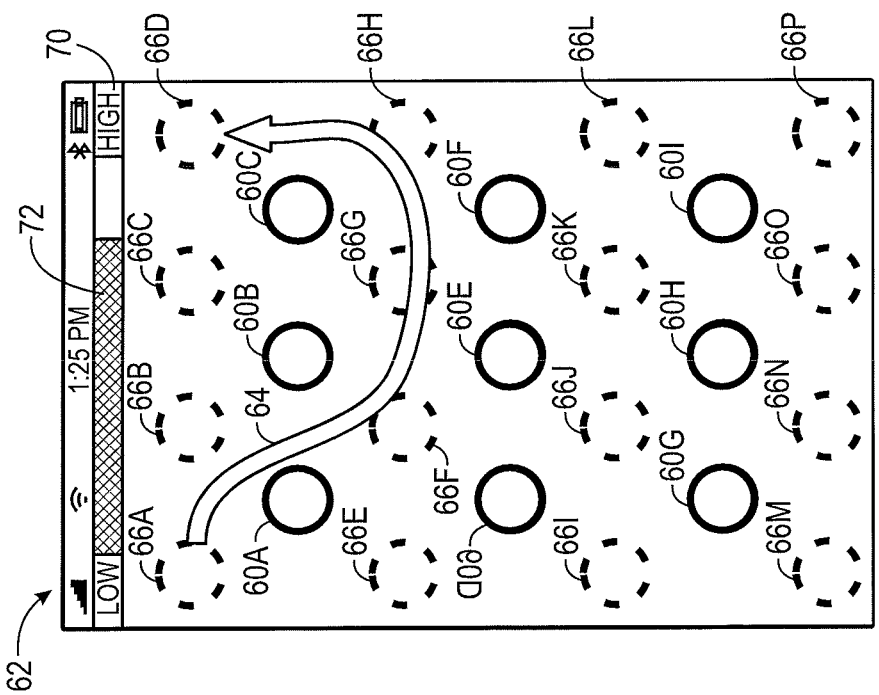

As discussed above with respect to FIG. 6, in certain embodiments, the gesture entry screen 62 may, in addition to the visible graphical elements 60A-60I, include an array of touch-sensing areas. Previously discussed embodiments of the touch-sensing areas have been discussed with respect to an array of hidden dots 66 interspersed among the visible graphical elements 60A-60I. Nevertheless, in alternative embodiments, the touch-sensing areas may include an invisible array or arrangement of crossing and connecting hidden lines 94. For example, as depicted in FIG. 14A, the array of hidden lines 94 may invisibly connect each of the visible graphical elements 60A-60I to at least one other adjacent, surrounding, or multi-directionally (e.g., vertically, horizontally, diagonally, etc.) neighboring visible graphical element 60A-60I. As will be discussed below, traveling a path across hidden lines 94 may further increase the total number of possible gesture entry combinations available to a user for the purpose of authentication and/or authorization.

Accordingly, various examples of gesture strokes 64, and by extension gestures, are depicted in FIGS. 14B-14H and FIGS. 15A-15G. Unlike the previously discussed hidden dots 66, the hidden lines 94 may be "enabled" or "disabled" based on the position of one or more fingers of a user, for example, as one or more gesture strokes 64 are performed. As discussed herein, "enabled" may refer to one or more hidden lines 94 that may be estimated or registered as part of an entered gesture due to the one or more hidden lines 94 being substantially orthogonal to one of several estimated possible travel paths of a gesture stroke 64. Contrastingly, as discussed herein, "disabled" may refer to one or more hidden lines 94 that may not be reregistered as part of an entered gesture due the one or more hidden lines 94 being substantially parallel to one of several estimated possible travel paths of a gesture stroke 64. Thus, by enabling and disabling hidden lines 94, the electronic device 10 may provide a barrier to estimate the possible direction or path the user will likely travel toward while entering a gesture.

Figure 14C:
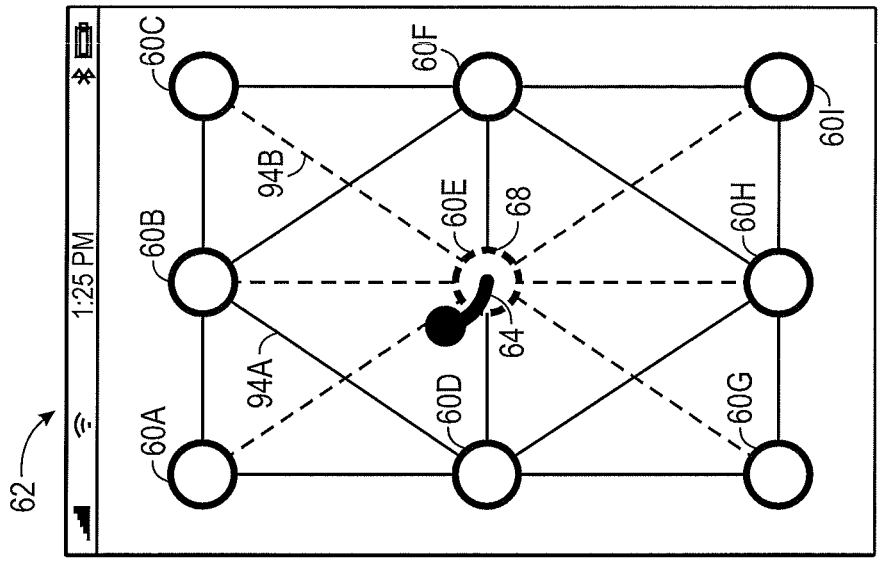
Figure 14B:
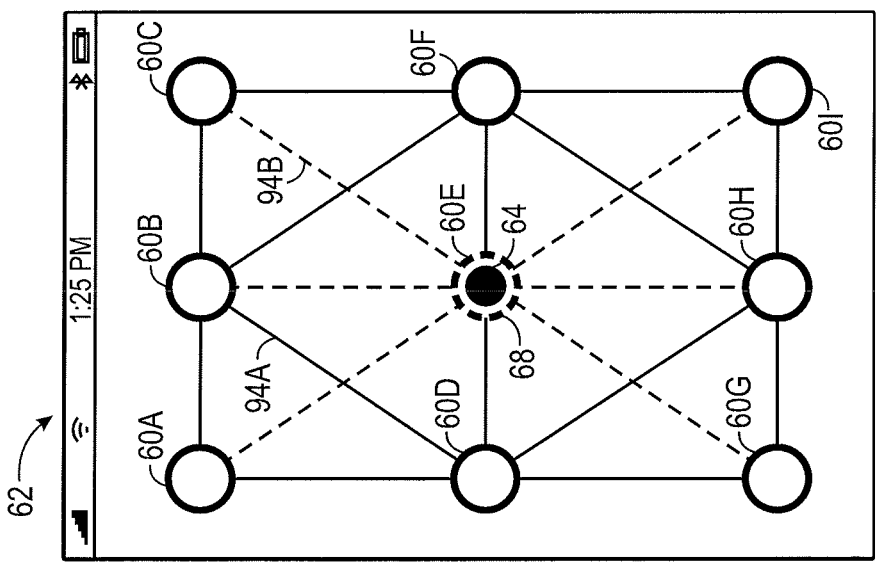

For example, as depicted in FIG. 14B, a user may begin to enter a gesture by touching the graphical element 60E. As shown, each hidden line 94A (illustrated as a solid hidden line) connected orthogonally to the possible gesture stroke 64 travel paths from graphical element 60E may remain enabled, while each hidden line 94B (illustrated as a dashed hidden line) connected in parallel to the possible gesture stroke 64 travel paths from graphical element 60E may become disabled. In one embodiment, even after the user begins to travel a path as depicted in FIG. 14C, the hidden lines 94B may remain disabled until the user travels across an enabled hidden line 94A. In another embodiment, the hidden lines 94B may remain disabled until the user travels substantially near an enabled hidden line 94A, such that it may be estimated that the user will attempt to travel across the enabled hidden line 94A.

Enabled, as depicted in FIG. 14C, a hidden line 94A may allow the gesture entry screen 62, for example, to register or process the exact location of the user's finger as the user performs a gesture stroke 64. For example, as illustrated in FIG. 14D, as the user travels a path across enabled hidden line 94C (illustrated as a solid, bold hidden line), the gesture stroke 64 may be mapped to each of the graphical elements 60B and 60D connected by the hidden line 94C, which may further indicate, for example, that the user crossed that particular hidden line 94C as opposed to another hidden line 94. Disabled, a hidden line 94B may allow the gesture entry screen 62, for example, to circumvent possibly registering or processing a hidden line 94 that is substantially parallel to the estimated possible travel path of the gesture stroke 64 as part of the user's entered gesture.

Figure 14E:
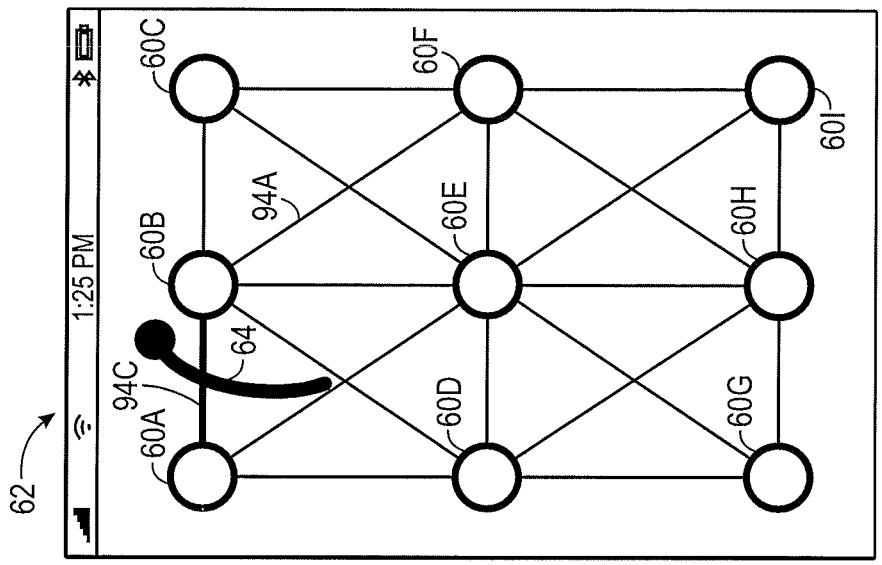
Figure 14D:
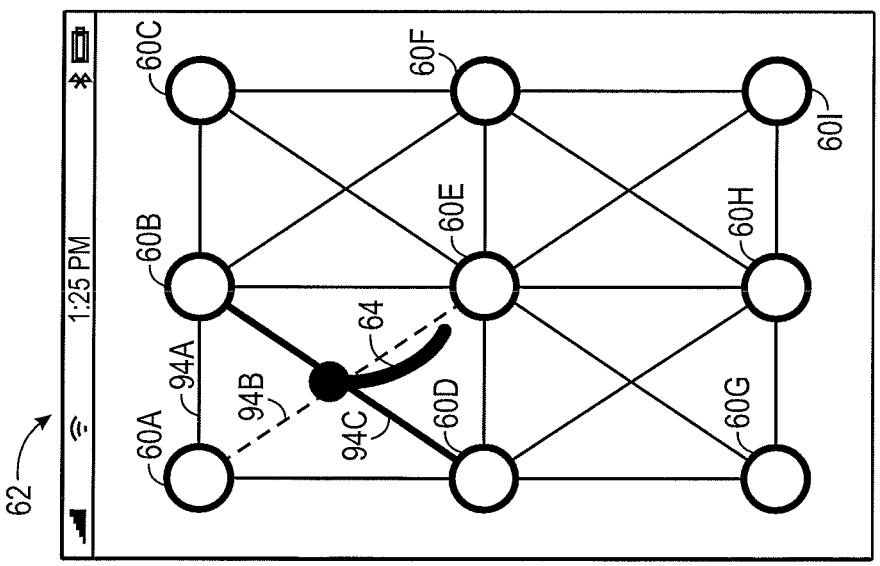
Figure 14G:
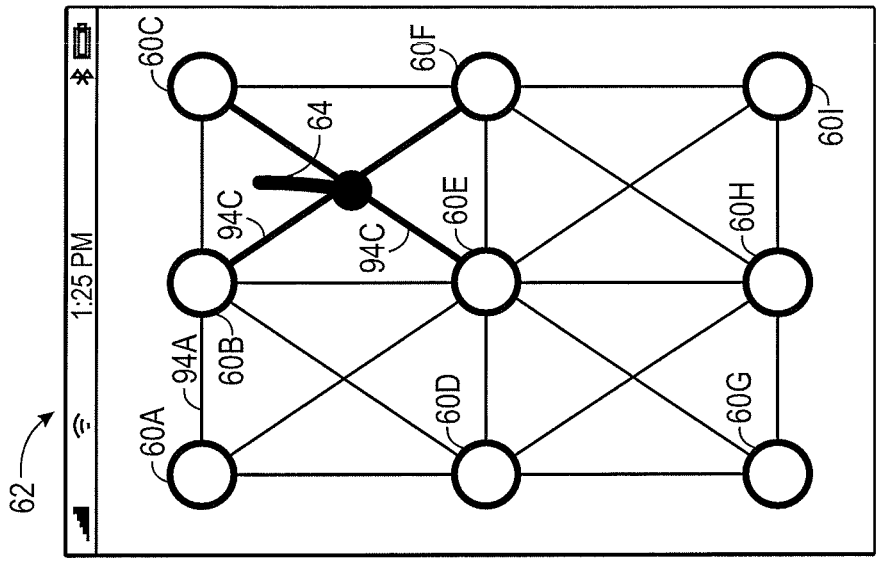
Figure 14F:
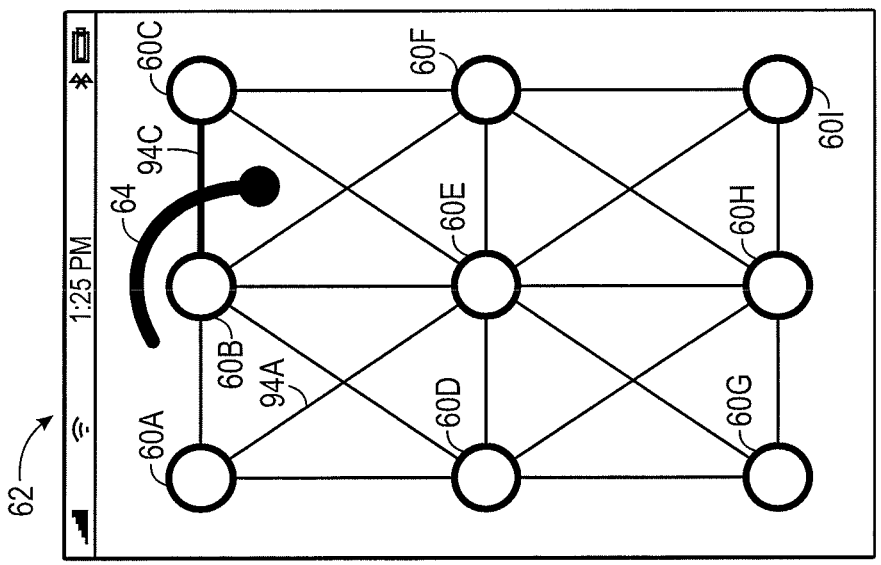
Figure 15A:
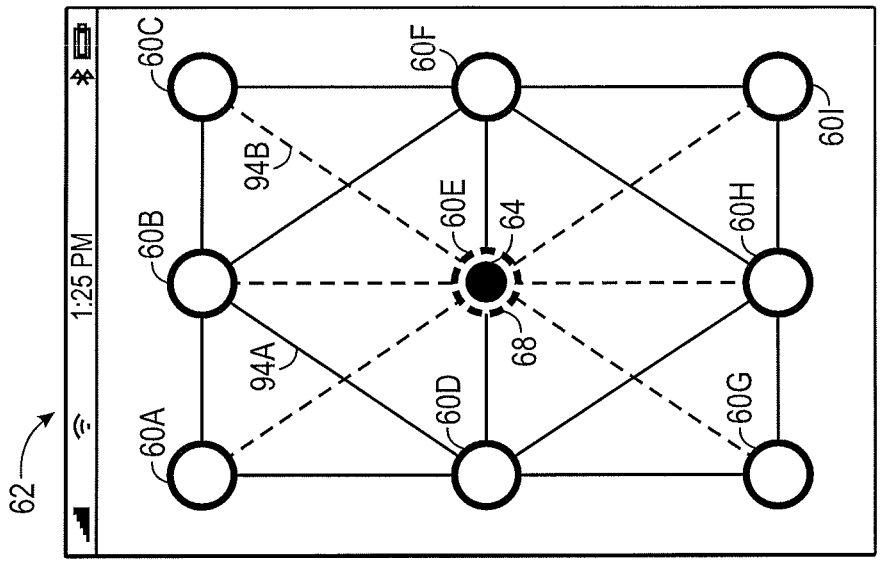
FIGS. 15A-15G depict alternative examples of an entered gesture through hidden lines on the gesture entry screen of FIG. 4 in accordance with present embodiments.
Figure 14H:
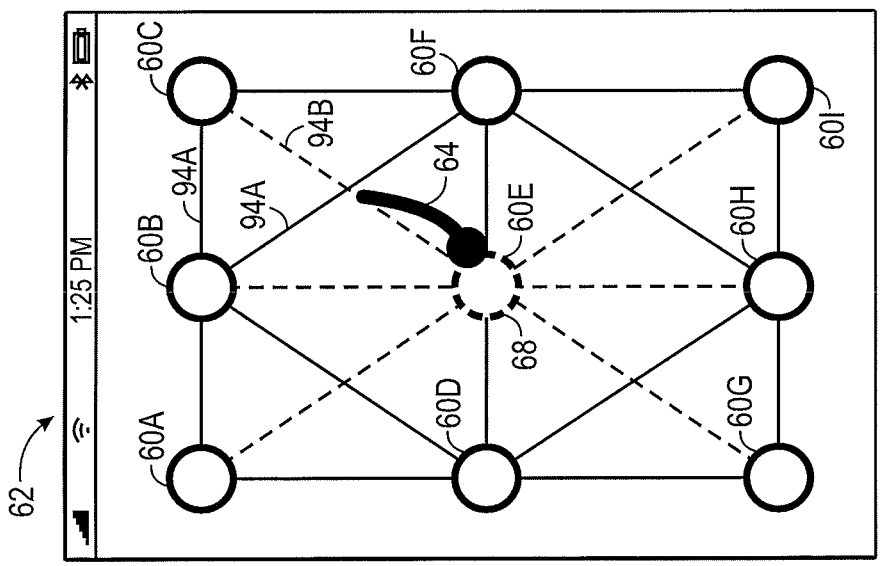
Figure 15C:
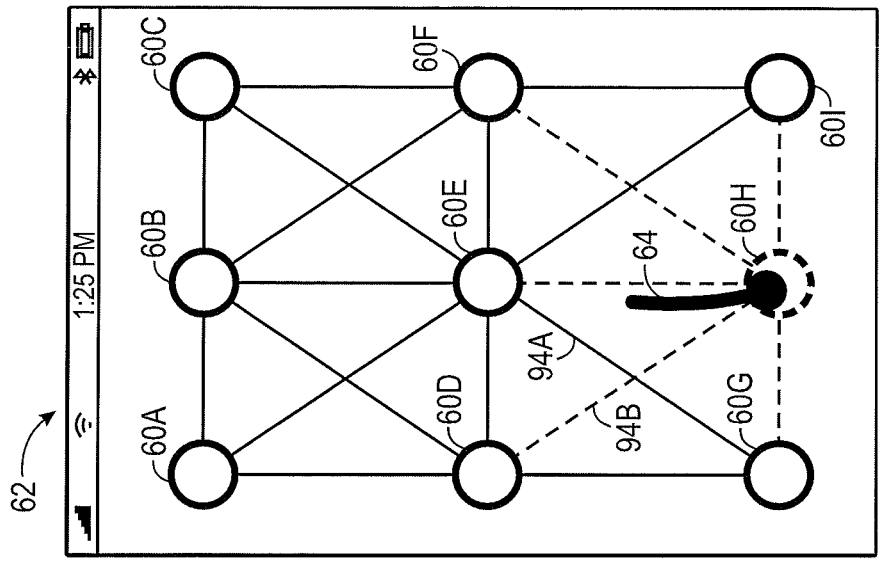
Figure 15B:
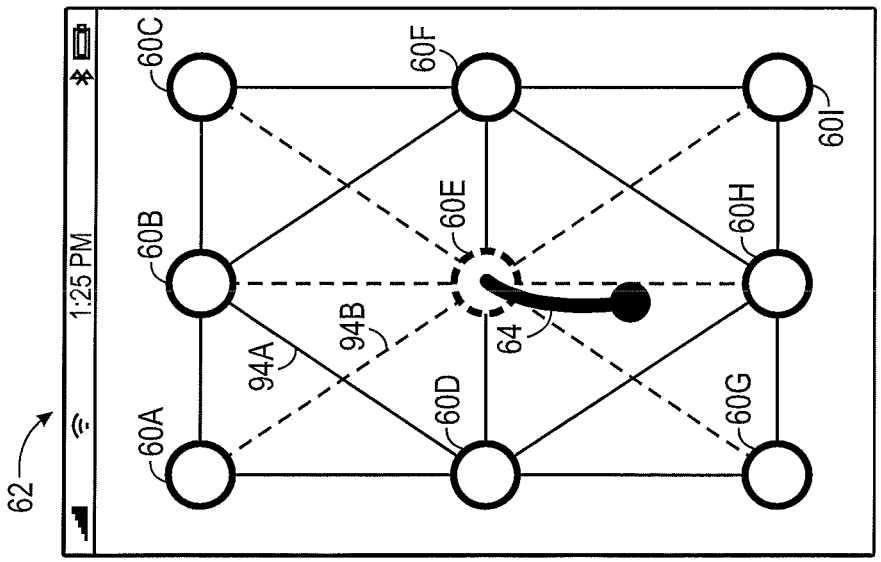
Figure 15E:
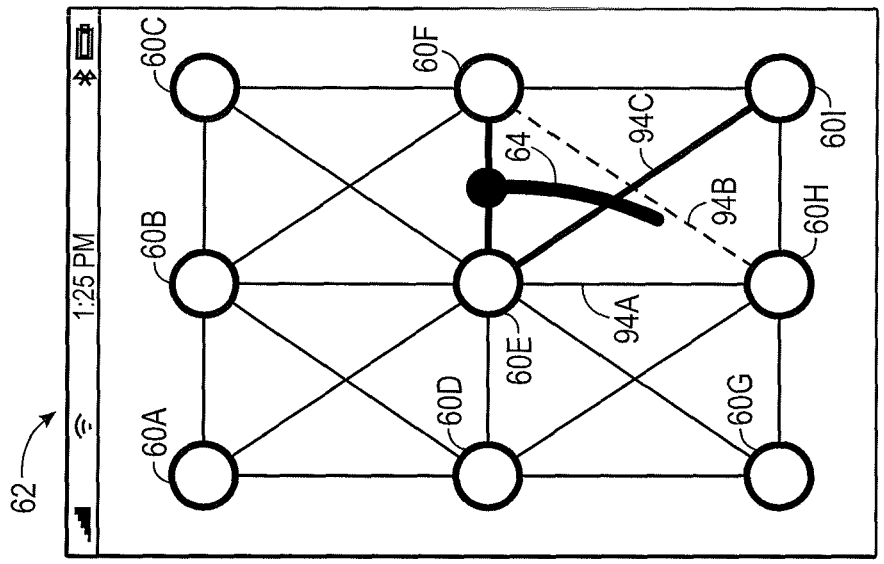
Figure 15D:
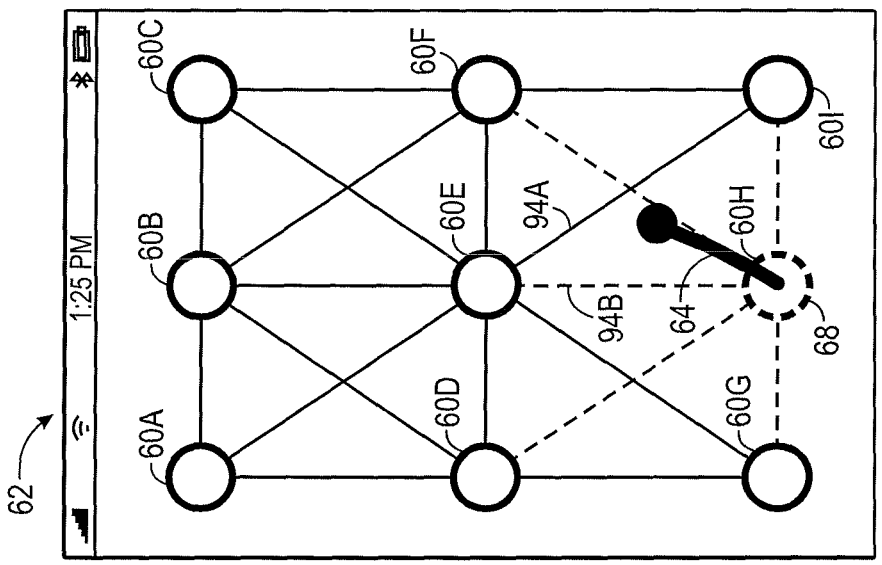
Figure 15G:
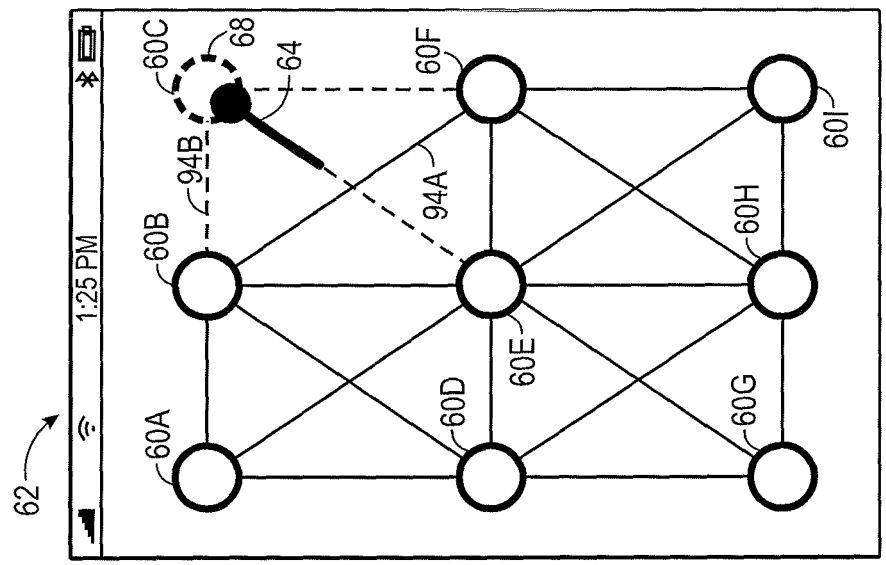
Figure 15F:
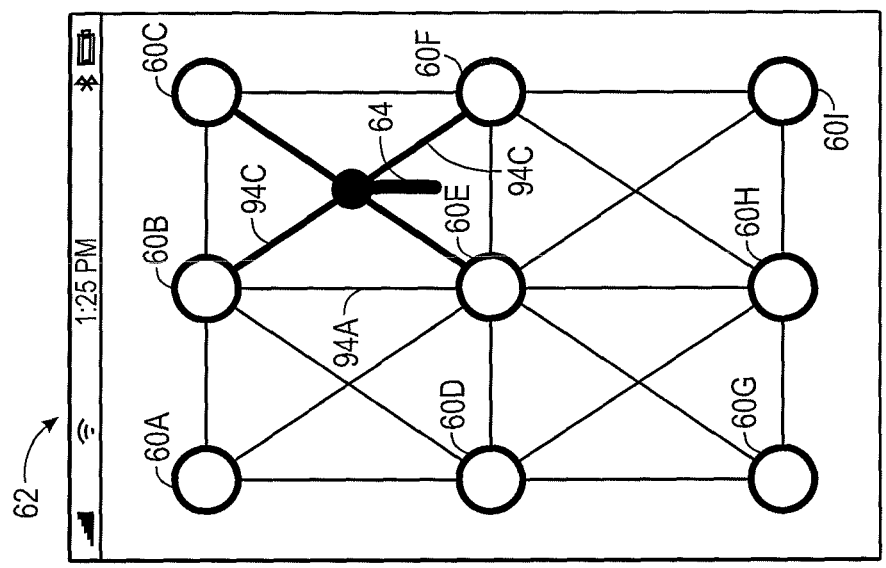

Likewise, FIGS. 14E-14H display similar examples of performing one or more gesture strokes 64 through the hidden lines 94. As illustrated in FIGS. 14E and 14F, as a gesture stroke 64 is performed by traveling to an area outside of the array of visible graphical elements 60A-60I and/or the array of hidden lines 94, each of the hidden lines 94 may become enabled, as the user may then travel a path orthogonal to any of the hidden lines 94. FIG. 14G illustrates a gesture stroke 64 as it crosses hidden lines 94C connecting graphical elements 60B, 60C, 60E, and 60F. In such a case, the gesture stroke 64 may be mapped to each of the graphical elements 60B, 60C, 60E, and 60F. As will be discussed in greater detail, such a gesture stroke 64 or path travel across hidden lines 94C connecting, for example, four graphical elements may be assigned a greater strength or weight, as again the gesture stroke 64 may be mapped to each of the connecting graphical elements. Continuing from FIG. 14G, FIG. 14H further illustrates that one or more of the hidden lines 94 may immediately switch between enabled or disabled based on the position of the user's finger at any given time. For example, again referring to FIG. 14G, hidden line 94B, having just previously been enabled as shown in FIG. 14F, becomes disabled as the gesture stroke 64 travels a path toward graphical element 60E.

Similar to FIGS. 14A-14G, FIGS. 15A-15G display a further example of performing a gesture through hidden lines 94. Particularly, FIGS. 15A-15D is very similar to what was previously discussed with respect to FIGS. 14B-14E, as the hidden lines 94 may be enabled or disabled based on the position of one or more fingers of a user, for example, as one or more gesture strokes 64 may be performed. Similar again to FIG. 14G, FIGS. 15E and 15F illustrate a gesture stroke 64 as it crosses hidden lines 94C connecting multiple graphical elements 60A-60I, in which case, as previously noted, the gesture stroke 64 may be mapped to each of the multiple connecting graphical elements. FIG. 15G again illustrates that one or more of the hidden lines 94 may switch between enabled or disabled based on the position of the user's finger at any given time. Although particular gesture entries are illustrated with respect to FIGS. 14A-14G and FIGS. 15A-15G, it should be appreciated that gestures may be entered by traveling across as many different hidden lines 94, or by traveling as many times across one or more of the same hidden lines 94, all at the discretion of the user.

Similarly, as discussed above with respect to FIGS. 13A-13E, various examples of entered gestures and corresponding gesture strength estimation indicators 70 are depicted in FIGS. 16A-16D. For example, FIG. 16A displays a strong gesture input, in that the gesture stroke 64A travels a path from graphical element 60A to graphical element 60C by crossing several crossing and connecting hidden lines 94A before looping up through graphical element 60F to graphical element 60C. Continuing, gesture stroke 64B travels in a circular path through graphical elements 60D and 60E and the connecting hidden lines 94A. The gesture stroke 64B may be performed concurrently with gesture stroke 64A or subsequent to performing gesture stroke 64A. Moreover, although displayed as a single circular path, the gesture stroke 64B may represent multiple (e.g., 2, 3, 4, 5, 6, etc.) circular paths through graphical elements 60D and 60E and connecting hidden lines 94. Accordingly, the gesture strength estimation indicator 70 may indicate a strong gesture input, displaying, for example, a green, nearby fully-extended progress bar 72. In contrast, FIG. 16B displays a relatively simple gesture input (e.g., gesture stroke 64) traveling directly from graphical element 60A to the column-adjacent graphical element 60D, and then directly through the neighboring graphical elements 60E and 60F. That is, the gesture stroke 64 travels through neither of the available invisible hidden lines 94. Such a gesture may warrant a weak gesture indication, in which the gesture strength estimation indicator 70 may display, for example, a red, only 10% extended progress bar 72.

Figure 16B:
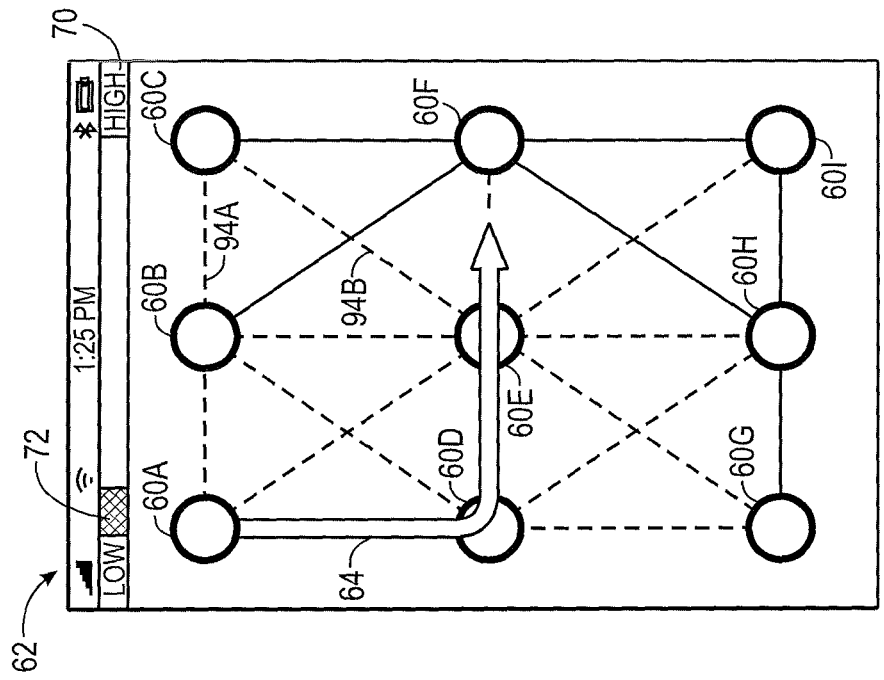
FIGS. 16A-16D depict examples of an entered gestures through hidden lines and corresponding strength estimation indicators on the gesture entry screen of FIG. 4 in accordance with present embodiments.
Figure 16A:
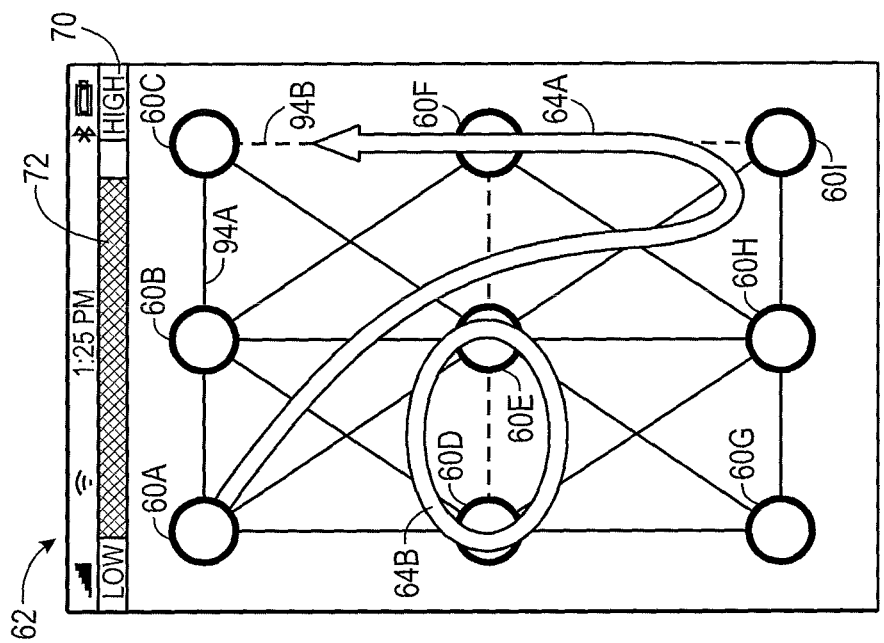
Figure 16D:
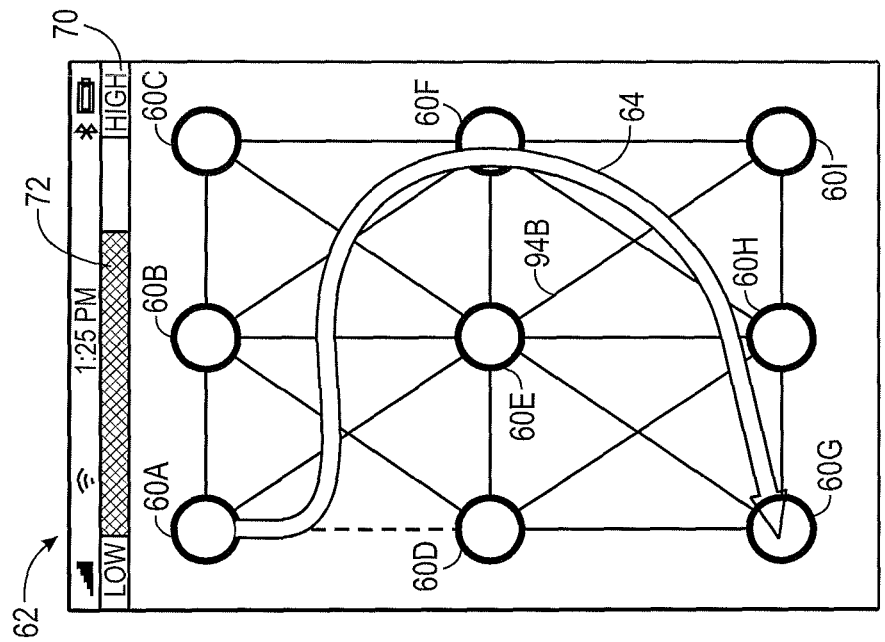
Figure 16C:
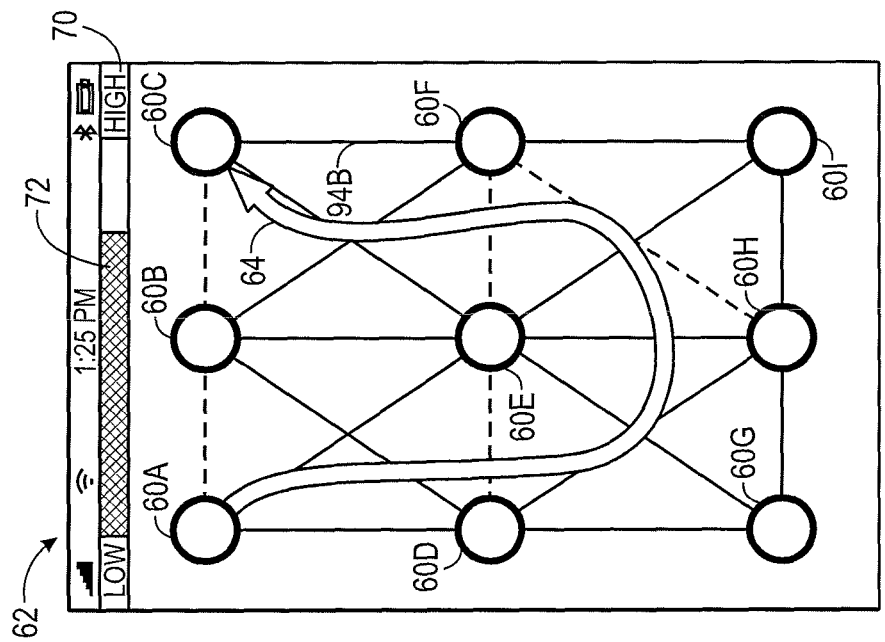

FIG. 16C and FIG. 16D illustrate other examples of a strong gesture inputs. As illustrated in FIG. 16C, the gesture stroke 64 travels a path from graphical element 60A to graphical element 60C by crossing through each of several hidden lines 94 connecting at least four graphical elements. As previously noted, such a gesture stroke 64 may be assigned a greater strength, as the connecting hidden lines 94 may be mapped to multiple graphical elements 60A-60I. Similarly, FIG. 16D illustrates a gesture stroke 64 traveling a path through a combination of graphical elements 60A-60I and crossing and connecting hidden lines 94. For example, as depicted, the gesture stroke 64 travels a path from graphical element 60A to graphical element 60G by passing through a combination of hidden lines 94 connecting at least four graphical elements (e.g., 60A, 60B, 60D, and 60E) and graphical element 60F. As a result, gesture strength estimation indicators 70 of FIGS. 16C and 16D may each indicate strong gesture inputs, displaying, for example, a green, nearby fully-extended progress bar 72.

Figure 17:
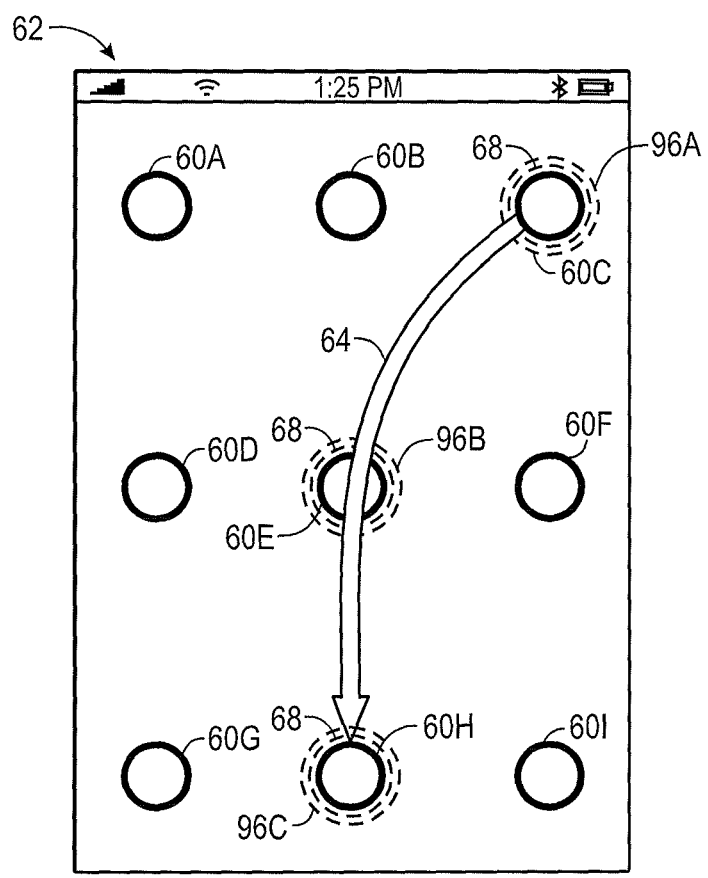
FIG. 17 depicts an example of illuminated contact disks on the gesture entry screen of FIG. 4 in accordance with present embodiments.

In certain embodiments, the finger contact discs 68 of the gesture entry screen 62 may display varying colors as the user, for example, travels from one graphical element 60A-60I to the next. For example, as depicted in FIG. 17, as the user travels (e.g. performs gesture strokes 64) from graphical element 60A to graphical element 60H, the finger contact discs 68 may display an illumination of colors 96A, 96B, and 96C, respectively, to indicate the estimated position of the user's finger as he or she enters a gesture. The color illuminations 96A, 96B, and 96C may each include colors such as white, yellow, red, orange, green, blue, and so forth, or may, in some embodiments, vary as the user travels a path through touch-sensing areas (e.g., hidden dots 66 and/or hidden lines 94).

The foregoing demonstrate various ways in which user authentication and/or authorization may be regulated and/or implemented by implementing gesture entry screen on an electronic device. While certain examples have been provided in the context of a handheld device and a tablet computing device, the techniques disclosed herein are equally applicable to any type of electronic device on which access to data or functions (such as applications or network connections) is limited or otherwise regulated. For example, access confidential information such as phone numbers, personal and professional contacts, electronic communications, information relating to finances or financial accounts, business related projects and documents, personal photos and videos, and so forth may be limited in view of the present techniques based on user authentication and/or authorization techniques as disclosed herein. Further, the gesture entry screen may further allow a user added security by including arrays of hidden dots and/or hidden lines to increase possible combinations of gesture entries. A strength estimation indicator may also indicate to the user the strength of the entered gesture before it is saved and utilized for the purpose of user authentication and/or authorization.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a touch-sensitive display; and
data processing circuitry configured to:
cause the touch-sensitive display to display a gesture saving user interface that includes a gesture entry region comprising:
a plurality of predefined selectable visible graphical elements displayed on the touch-sensitive display;
a plurality of predefined selectable invisible elements not displayed on the touch-sensitive display; and
interstitial regions on the touch-sensitive display that do not contain predefined selectable visible graphical elements and do not contain predefined selectable invisible elements;
detect movement of a first contact on the touch-sensitive display that includes movement through a combination of one or more of the predefined selectable visible graphical elements, one or more of the predefined selectable invisible elements, and one or more of the interstitial regions, wherein the movement of the first contact comprises movement from at least one selectable visible graphical element to at least one selectable invisible element that passes through at least one interstitial region;
determine a sequence in which the first contact moves through the one or more predefined selectable visible graphical elements and the one or more predefined selectable invisible elements without regard to motion of the first contact within the interstitial regions; and
save the sequence of the one or more predefined selectable visible elements and the one or more predefined selectable invisible elements as an entered gesture.

2. The electronic device of claim 1, wherein the plurality of predefined selectable visible graphical elements comprises an array of visible dots displayed on the touch-sensitive display.

3. The electronic device of claim 2, wherein the plurality of predefined selectable invisible elements comprises an array of hidden dots not displayed on the touch-sensitive display.

4. The electronic device of claim 3, wherein the array of hidden dots is a subset of the array of visible dots.

5. The electronic device of claim 3, wherein the array of visible dots is a subset of the array of hidden dots.

6. The electronic device of claim 1, wherein the entered gesture comprises receiving the combination of the one or more of the predefined selectable visible graphical elements, the one or more of the predefined selected selectable invisible elements, the one or more of the interstitial regions during a user-selected time period.

7. The electronic device of claim 1, wherein the data processing circuitry is configured to assign a strength indication based on the combination of the one or more of the predefined selectable visible graphical elements, the one or more of the predefined selectable invisible elements, and the one or more of the interstitial regions.

8. The electronic device of claim 7, wherein the strength indication comprises a bar that transitions from empty to full proportional to the estimated strength of the entered gesture.

9. The electronic device of claim 7, wherein the entered gesture is not saved until a strength of the entered gesture is estimated as strong.

10. The electronic device of claim 1, wherein the plurality of predefined selectable invisible elements comprise a plurality of hidden lines that connect respective selectable visible graphical elements to an immediately adjacent selectable visible graphical element, an immediately diagonal selectable visible graphical element, or a combination thereof.

11. The electronic device of claim 10, wherein the entered gesture comprises a number of crossed hidden lines.

12. The electronic device of claim 10, wherein the entered gesture comprises a number of a combination of selected selectable visible graphical elements and crossed hidden lines.

13. The electronic device of claim 1, wherein the data processing circuitry is configured to display a disk representing a user's gesture entry while the entered gesture is received, wherein the disk position corresponds to an estimated position of the user's gesture.

14. The electronic device of claim 1, wherein the data processing circuitry is configured to illuminate the one or more of the predefined selectable visible graphical elements when the one or more of the predefined selectable visible graphical elements are selected while receiving the entered gesture.

15. A method comprising:
displaying on a touch-sensitive display of an electronic device, a gesture saving user interface that includes a gesture entry region comprising:
a plurality of predefined selectable visible graphical elements displayed on the touch-sensitive display;
a plurality of predefined selectable invisible elements not displayed on the touch-sensitive display; and
interstitial regions on the touch-sensitive display that do not contain predefined selectable visible graphical elements and do not contain predefined selectable invisible elements;
detecting movement of a first contact on the touch-sensitive display that includes movement through a combination of one or more of the predefined selected visible selectable graphical elements, one or more of the predefined selected invisible selectable touch-sensing elements, and one or more of the interstitial regions, wherein the movement of the first contact comprises movement from at least one selected visible selectable graphical element to at least one selected invisible selectable touch-sensing element that passes through at least one interstitial region, and wherein the selected invisible selectable touch-sensing elements are not displayed on the touch-sensitive display;
determine a sequence in which the first contact moves through the one or more predefined selectable visible elements and the one or more predefined selectable invisible elements without regard to motion of the first contact within the interstitial regions; and
saving the sequence of movement of the first contact through the one or more predefined selectable visible elements and the one or more predefined selectable invisible elements as an entered gesture.

16. The method of claim 15, wherein the entered gesture is not saved until a strength of the entered gesture is estimated as strong.

17. The method of claim 15, comprising displaying an illuminated disk representative of a path of the entered gesture while receiving the entered gesture.

18. The method of claim 15, wherein the entered gesture comprises a first predefined selectable visible graphical element or predefined selectable invisible element and a second predefined selectable visible graphical element or predefined selectable invisible element that is not adjacent to the first predefined selectable visible graphical element or predefined selectable invisible element.

19. The method of claim 15, wherein saving the entered gesture comprises utilizing the entered gesture for a future authentication process.

20. The method of claim 15, wherein saving the entered gesture comprises utilizing the entered gesture for a future authorization process.

21. The method of claim 15, wherein saving the entered gesture comprises restricting access to the electronic device if a future entered gesture is not substantially similar to the saved entered gesture.

22. The method of claim 15, wherein saving the entered gesture comprises allowing access to the electronic device if a future entered gesture is substantially similar to the saved entered gesture.

23. A touch-sensitive electronic device configured to:
display on a touch-sensitive display of the touch-sensitive electronic device a gesture saving user interface that includes a gesture entry region comprising:
a plurality of predefined selectable visible graphical elements displayed on the touch-sensitive display and
a plurality of predefined selectable invisible elements not displayed on the touch-sensitive display, wherein there are interstitial regions on the touch-sensitive display that do not contain predefined selectable visible graphical elements and do not contain predefined selectable invisible elements;
detect movement of a first contact on the touch-sensitive display that includes movement through a combination of one or more of the predefined selectable visible graphical elements, one or more of the predefined selectable invisible elements, and one or more of the interstitial regions, wherein the movement of the first contact gesture comprises movement from at least one selectable visible graphical element to at least one selectable invisible element that passes through at least one interstitial region;
determine a sequence in which the first contact moves through the one or more predefined selectable visible graphical elements and the one or more predefined selectable invisible elements without regard to motion of the first contact within the interstitial regions; and
save the sequence of movement of the first contact through the one or more predefined selectable visible elements and the one or more predefined selectable invisible elements as an entered gesture.

24. The touch-sensitive electronic device of claim 23, wherein the touch-sensitive electronic device is configured to assign a strength indication based on the combination of the one or more of the predefined selectable visible graphical elements, the one or more of the predefined selectable invisible elements, and the one or more of the interstitial regions.

25. The touch-sensitive electronic device of claim 23, wherein the touch-sensitive electronic device is configured to estimate a path of the entered gesture further based on a subsequently selected visible selectable graphical element or a subsequently selected invisible selectable element.

26. The touch-sensitive electronic device of claim 25, wherein the touch-sensitive electronic device is configured to assign a strength indication based on the subsequently selected visible selectable graphical element or the subsequently selected invisible selectable element in the path.

27. The touch-sensitive electronic device of claim 23, wherein the touch-sensitive electronic device is configured to receive multiple selections of at least one predefined selectable visible graphical element while receiving the entered gesture.

28. The touch-sensitive electronic device of claim 23, wherein the touch-sensitive electronic device is configured to receiving multiple selections of at least one predefined selectable invisible element while receiving the entered gesture.

29. The electronic device of claim 1, wherein the plurality of predefined selectable visible graphical elements displayed on the touch-sensitive display are distinct from the plurality of predefined selectable invisible elements not displayed on the touch-sensitive display.

30. The electronic device of claim 29, wherein the plurality of predefined selectable invisible elements not displayed on the touch-sensitive display comprises a finite set of touch sensing elements on the touch-sensitive display.

31. The method of claim 15, wherein the entered gesture comprises a combination of the predefined selectable visible graphical elements and a distinct combination of the predefined selectable invisible elements.

32. The touch-sensitive electronic device of claim 23, wherein the predefined selectable visible graphical elements are separate from the predefined selectable invisible elements.

33. The electronic device of claim 1, wherein the data processing circuitry is further configured to:

after saving the entered gesture, display an unlock user interface that includes the gesture entry region while one or more functions of the device in a locked state;

while displaying the unlock user interface, detect movement of a second contact on the touch-sensitive surface that is different from the movement of the first contact; and in response to detecting the movement of the second contact:
  in accordance with a determination that the movement of the second contact includes movement through the one or more predefined selectable visible elements and the one or more predefined selectable invisible elements in the sequence that corresponds to the entered gesture without regard to motion of the second contact within the interstitial regions, transition the one or more functions of the device to an unlocked state; and
  in accordance with a determination that the movement of the second contact does not include movement through the one or more predefined selectable visible elements and the one or more predefined selectable invisible elements in the sequence that corresponds to the entered gesture without regard to motion of the second contact within the interstitial regions, maintain the one or more functions of the device in the locked state.

\* \* \* \* \*